(12) United States Patent
Do et al.

(10) Patent No.: US 11,232,554 B1
(45) Date of Patent: Jan. 25, 2022

(54) MACHINE-LEARNING BASED CAMERA IMAGE TRIGGERING FOR QUALITY ASSURANCE INSPECTION PROCESSES

(71) Applicant: Elementary Robotics, Inc., South Pasadena, CA (US)

(72) Inventors: Dat Do, Los Angeles, CA (US); Arye Barnehama, San Marino, CA (US)

(73) Assignee: Elementary Robotics, Inc., South Pasadena, CA (US)

( * ) Notice: Subject to any disclaimer, the term of this patent is extended or adjusted under 35 U.S.C. 154(b) by 0 days.

(21) Appl. No.: 17/341,304

(22) Filed: Jun. 7, 2021

(51) Int. Cl.
| | |
|---|---|
| G06T 7/00 | (2017.01) |
| G06K 9/03 | (2006.01) |
| G06K 9/78 | (2006.01) |
| G06T 7/70 | (2017.01) |
| G06K 9/38 | (2006.01) |
| G06K 9/46 | (2006.01) |
| G06K 9/62 | (2006.01) |
| G06N 3/04 | (2006.01) |
| G06N 3/08 | (2006.01) |
| G06T 7/246 | (2017.01) |

(52) U.S. Cl.
CPC .............. *G06T 7/001* (2013.01); *G06K 9/036* (2013.01); *G06K 9/38* (2013.01); *G06K 9/4671* (2013.01); *G06K 9/623* (2013.01); *G06K 9/78* (2013.01); *G06N 3/04* (2013.01); *G06N 3/08* (2013.01); *G06T 7/248* (2017.01); *G06T 7/70* (2017.01); *G06T 2207/20081* (2013.01); *G06T 2207/20084* (2013.01); *G06T 2207/30168* (2013.01); *G06T 2207/30241* (2013.01)

(58) Field of Classification Search
CPC . G06T 2207/30241; G06T 2207/30168; G06T 2207/20084; G06T 2207/20081; G06T 7/70; G06T 7/248; G06T 7/001; G06N 3/08; G06N 3/04; G06K 9/78; G06K 9/623; G06K 9/4671; G06K 9/38; G06K 9/036

See application file for complete search history.

(56) References Cited

U.S. PATENT DOCUMENTS

| | | | |
|---|---|---|---|
| 10,217,307 B2 * | 2/2019 | Phillips | .................. G06F 3/0486 |
| 10,957,041 B2 * | 3/2021 | Yip | ............................ G06T 7/11 |
| 2005/0278049 A1 * | 12/2005 | Van Den Nieuwelaar | ................... G03F 7/70533 700/100 |
| 2006/0092274 A1 | 5/2006 | Good et al. | |
| 2006/0181700 A1 * | 8/2006 | Andrews | .............. G01N 21/474 356/237.2 |

(Continued)

OTHER PUBLICATIONS

Agrawal, Harsh, CloudCV: deep learning and computer vision on the cloud. Diss. Virginia Tech, 2016.

*Primary Examiner* — Mia M Thomas
(74) *Attorney, Agent, or Firm* — Jones Day

(57) ABSTRACT

Data is received that includes a feed of images of a plurality of objects passing in front of an inspection camera module forming part of a quality assurance inspection system. Within each image, it is detected whether an object is present within the image. Instance identifiers are assigned to each object. A single image is identified in which the object is optimally represented for each object using the corresponding instance identifier. These identified images are provided to a consuming application or process for quality assurance analysis.

29 Claims, 18 Drawing Sheets

(56) References Cited

U.S. PATENT DOCUMENTS

| | | | |
|---|---|---|---|
| 2015/0324965 A1* | 11/2015 | Kulkarni | G06T 7/74 |
| | | | 382/144 |
| 2018/0113083 A1* | 4/2018 | Van Dael | G01N 33/025 |
| 2018/0238164 A1* | 8/2018 | Jamison | E21B 44/06 |
| 2018/0322623 A1 | 11/2018 | Memo et al. | |
| 2018/0376067 A1* | 12/2018 | Martineau | G06T 7/292 |
| 2019/0287237 A1* | 9/2019 | de Bonfim Gripp | G06T 5/30 |
| 2019/0318484 A1* | 10/2019 | Dougherty | G06T 7/162 |
| 2020/0134800 A1* | 4/2020 | Hu | G06K 9/6202 |
| 2021/0174486 A1* | 6/2021 | Chowhan | G06T 7/0002 |

* cited by examiner

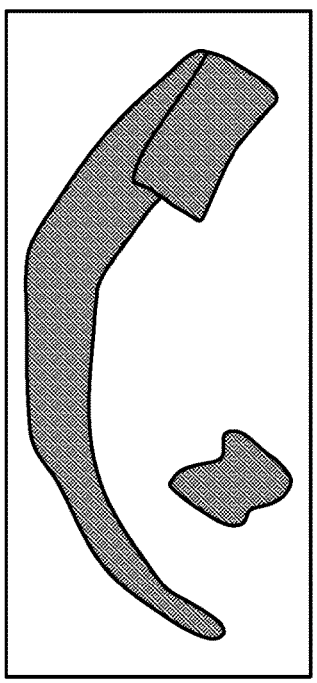 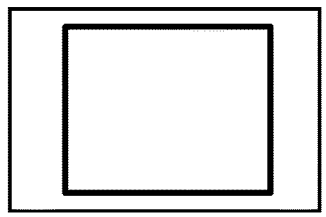 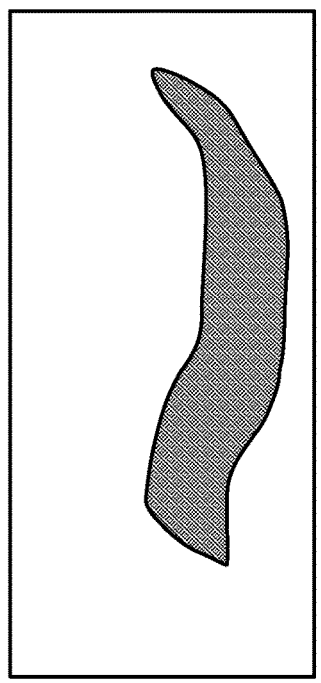
FIG. 8

MACHINE-LEARNING BASED CAMERA IMAGE TRIGGERING FOR QUALITY ASSURANCE INSPECTION PROCESSES

TECHNICAL FIELD

The subject matter described herein relates to advanced quality assurance techniques for configuring and implementing different image analysis inspection tools to characterize objects passing in front of one or more inspection camera modules such as on a production line, and displaying results and analysis to users.

BACKGROUND

Manufacturing and supply chain processes are becoming increasingly sophisticated through the adoption of advanced, high-speed automation systems. Given the high throughput of objects through these systems, frequent changeover of parts, as well as increased manufacturing and logistics demands, quality assurance activities can be difficult to implement. It is important to make the processes of procurement, setup and monitoring as easy as possible in order to drive up adoption of automated camera-based quality inspection systems. Techniques such as minimizing hardware configurations, moving solutions from hardware to software domains, and providing insights and explainability around algorithm performance are examples of ways in which the process of implementing automated camera-based quality assurance systems can be made more simple.

SUMMARY

In a first aspect for providing quality assurance, a video processing pipeline receives data derived from a feed of images of a plurality of objects passing in front of an inspection camera module forming part of a quality assurance inspection system. Quality assurance metrics for the object are generated by one or more containerized image analysis inspection tools forming part of the video processing pipeline using the received data for each object. Overlay images are later generated that characterize the quality assurance metrics. These overlay images are combined with the corresponding image of the object to generate an enhanced image of each of the objects. These enhanced images are provided to a consuming application or process for quality assurance analysis.

The overlay image can contain color and transparency information derived from the generated quality assurance metrics for the object.

A first of the image analysis inspection tools can utilize computer vision algorithms in generating quality assurance metrics and a second of the image analysis tools can utilize machine learning in generating quality assurance metrics.

At least a portion of the overlay images can be empty. In some variations, overlay images are only generated when the quality assurance metrics are above a defined threshold.

Areas of interest within each of the images can be identified such that only image data corresponding to the identified areas of interest are passed to the one or more image analysis inspection tools.

Providing the enhanced images can include one or more of visually displaying the enhanced images in an electronic visual display, transmitting the enhanced images to a remote computing system, loading the enhanced images into memory, or storing the enhanced images in physical persistence. For example, the enhanced images can be stored in a database or cloud storage for analytics, historical review, and the like. Providing the enhanced image can in some cases include compressing the enhanced image to a video stream.

The received data can be derived from a video feed (i.e., a series of images, etc.) of a manufacturing production line or other supply chain line for the objects.

One of the quality assurance inspection tools can include an anomaly detector that determines, on a pixel-by-pixel basis whether attributes of the object are anomalous in relation to a reference image or training data set of images. The anomaly detector can utilize one or more machine learning models including, for example, a convolutional neural network, and in some cases, a fully convolutional network.

One of the quality assurance inspection tools can execute one or more dimensional modification algorithms to cause a dimension of the image to more closely reflect a reference image. One of the quality assurance inspection tools can modify a color space for the images. One of the quality assurance inspection tools causes an image to be sharpened or blurred.

A first color (e.g., green, etc.) in the overlay image can correspond to a first result (e.g., pass, etc.), and a second color (e.g., red, etc.) in the overlay image can corresponds to a second, different result (e.g., fail, etc.).

In an interrelated aspect for providing quality assurance, data derived from a feed of images of a plurality of objects passing in front of an inspection camera module forming part of a quality assurance inspection system is received. Subsequently, two or more different and containerized image analysis inspection tools generate quality assurance metrics for the object using the received data for each object. Overlay images characterizing the quality assurance metrics are then generated. The overlay images are combined with the corresponding image of the object to generate an enhanced image of each of the objects. Thereafter, the enhanced images are provided to a consuming application or process for quality assurance analysis.

In a further interrelated aspect for providing quality assurance, data is received that is derived from a feed of images of a plurality of objects passing in front of an inspection camera module forming part of a quality assurance inspection system. At least one machine learning model then generates quality assurance metrics for the object using the received data. Overlay images characterizing the quality assurance metrics are generated which visualize why the machine learning model(s) generated the corresponding quality assurance metrics. The overlay images can include color and transparency values in which pixels have varying color and transparency values correspond to a level to which they contributed to the quality assurance metrics. The overlay images are combined with the corresponding image of the object to generate an enhanced image of each of the objects. The enhanced images are provided to a consuming application or process for quality assurance analysis.

The machine learning model can take various forms including a convolutional neural network acting as an anomaly detector which is composed of convolutional layers and contains no linear layers. The convolutional neural network can be trained to detect certain classes, and the overlay image can visually and distinctly indicate the detected certain classes.

In yet another aspect for providing quality assurance, each of a plurality of co-located inspection camera modules captures raw images of objects passing in front of the co-located inspection camera modules which form part of a quality assurance inspection system. The inspection camera modules have either a different image sensor or lens focal properties and generate different feeds of raw images. The co-located inspection camera modules can be selectively switched amongst to activate the corresponding feed of raw images. The activated feed of raw images is provided to a consuming application or process for quality assurance analysis.

A first of the co-located inspection camera modules can be a detail camera inspection module having a first focal distance lens and a second of the co-located inspection camera modules can be an overview inspection camera module having a second focal distance lens that is shorter than the first focal distance and is positioned to provide an overview of an environment in which the objects are passing in front of the co-located inspection camera modules. In some variations, two or more of the co-located inspection cameras are detail camera inspection modules (whether with an overview inspection camera module or without one).

The selectively switching can include receiving data comprising a request (e.g., a user command initiated via a UI, etc.) to switch to a feed of raw images for a particular one of the co-located inspection camera modules such that the activated feed of raw images corresponds to the particular one of the co-located inspection camera modules.

One or more of the co-located inspection camera modules comprises a software controllable focus module which can be configured remotely. For example, data can be received that includes instructions (e.g., a user command initiated via a UI, etc.) to modify a focus attribute for a particular one of the co-located inspection camera modules. A signal is sent to the particular one of the co-located inspection camera modules to modify the focus attribute which causes a change in an image attribute for subsequent raw images generated by the particular co-located inspection camera module receiving the sent signal. The selective switching can be performed by a software switch such as a software-based multiplexer.

A field of view for each of the co-located inspection camera modules can overlap with the fields of view for each of the other co-located inspection camera modules.

A field of view for each of a first subset of the co-located inspection camera modules can overlap with the fields of view for each of the other co-located inspection camera modules in the first subset. With this variation, a field of view for each of a second subset of the co-located inspection camera modules can overlap with all of the fields of view for the inspection camera modules in the first subset.

At least one of the co-located inspection camera modules can have a global shutter. At least one of the co-located inspection camera modules can capture images in full color. In some variations, each of the co-located inspection camera modules includes an identical image sensor. In other variations, the co-located inspection camera modules include lenses with different lens focal properties.

The inspection camera modules can take various forms including all within a single printed circuit board assembly, within a single system on a chip, or alternatively on different printed circuit board assemblies and on different systems on a chip.

In another interrelated aspect for providing quality assurance, raw images of objects passing in front of the co-located inspection camera modules are captured by each of a plurality of co-located inspection camera modules and a non-co-located inspection camera module which form part of a quality assurance inspection system. Each of the inspection camera modules has a different focal distance and generates respective, different feeds of raw images. The inspection camera modules are selectively switched among to activate the corresponding feed of raw images. The activated feed of raw images are provided to a consuming application or process for quality assurance analysis.

The co-located inspection camera modules can each be detail inspection camera modules and the non-co-located inspection camera modules can be an overview inspection camera module in which the overview inspection camera module is positioned to provide an overview of an environment in which the objects are passing in front of the co-located inspection camera modules.

In yet another interrelated aspect for providing quality assurance includes a plurality of co-located inspection camera modules each configured to capture raw images of objects passing in front of the co-located inspection camera modules. Each of the inspection camera modules has a different focal distance and generates respective, different feeds of raw images. The inspection camera modules form part of a quality assurance inspection system. The co-located inspection camera modules are selectively switched to activate the corresponding feed of raw images and the activated feed of raw images is provided to a consuming application or process for quality assurance analysis.

A first of the co-located inspection camera modules can have a narrow angle lens and a second of the co-located inspection camera modules can have a wide angle lens and is positioned to provide an overview of an environment in which the objects are passing in front of the co-located inspection camera modules.

In another interrelated aspect for quality assurance, data is received that includes a feed of images of a plurality of objects passing in front of an inspection camera module forming part of a quality assurance inspection system. Within each image, it is detected whether an object is present within the image. Instance identifiers are assigned to each object. A single image is identified in which the object is optimally represented for each object using the corresponding instance identifier. These identified images are provided to a consuming application or process for quality assurance analysis.

Optimally represented can take various forms including a most centered representation of the object across all images including the object, a sharpest representation of the object across all images including the object, and other attributes specified by a user. Optimally represented can include a representation of the object having image properties closest to a set of reference images on which a quality assurance inspection tool was configured or trained. The image properties can be based on various aspects including one or more of sharpness, blurriness, color space or visual similarity score.

In some variations, images for each object other than the corresponding identified single image are discarded.

The providing can take various forms including one or more of: loading the identified images into memory, storing the identified images in physical persistence, causing the identified images to be visually displayed in a graphical user interface, or transmitting the identified images to a remote computing system.

The detecting can include generating, using at least one machine learning model, a mask that indicates, via a probability on a per pixel basis, a likely location of an object within each image. The at least one machine learning model can take various forms including a convolutional neural network (e.g., a fully convolutional network, etc.) that is trained using a dataset with per pixel labels indicating locations of salient objects within images.

A binarized image can be generated, based on the output of the convolutional neural network, to indicate pixels within each image at which an object was detected. In addition, in some variations, the generating of the binarized image can include changing pixels within a predefined Hue Saturation Value (HSV) range to a first value, and changing pixels outside the predefined HSV range to a second value.

The generating of the binarized image can include determining motion between two adjacent images in the feed. Such motion determination can be made using at least one machine learning model such as, for example, a convolutional network that produces a vector corresponding to an array of pixels indicating motion between the two adjacent images. The convolutional neural network used for the motion determination can be trained using a loss function that encourages the convolutional neural network to learn a set of weights that minimizes a distance between outputs of the convolutional neural network and a ground truth optical flow. Based on the output of the convolutional neural network, a binarized image can be generated to indicate pixels within each image at which an object was detected.

The assigning can include determining a centroid of an object in each image, estimating a trajectory of the centroids of the objects in each image relative to one or more preceding images, and stopping tracking of the object when the estimated trajectory goes outside a corresponding image. The identifying can include determining an image in a trajectory of the object in which a centroid of an object is closest to a center of the image.

The identifying can include filtering out images based on image exclusion criteria such as whether or not the objects are above or below a predetermined size and/or within a predefined trajectory.

In some variations, one or more of the detecting, assigning, and identifying are constrained within a region of interest of each image.

In another aspect relating to quality assurance, data is received that includes a feed of images of a plurality of objects passing in front of an inspection camera module forming part of a quality assurance inspection system. Thereafter, it is detected whether there is an object within each image. Based on this detection, images in which each object is detected that meet predefined object representation parameters are identified (on an object-by-object basis, etc.). The identified images are provided to a consuming application or process for quality assurance analysis.

At least a portion of the objects can have at least one dimension greater than a field of view of the inspection camera module. Stated in other words, in some cases the objects are larger than the detection area of the inspection camera module.

The predefined object representation parameters can be based on many factors (including a multitude of factors) including, for example, centeredness, trajectory, minimum object size, maximum object size, sharpness, similarity to preceding images in the feed of images, or color space.

The providing can include one or more of: loading the images into memory, storing the images in physical persistence, causing the images to be visually displayed in a graphical user interface, or transmitting the images to a remote computing system.

The detecting can include generating, using at least one machine learning model, a mask that indicates, via a probability on a per pixel basis, a likely location of an object within each image. The at least one machine learning model can be a convolutional neural network that is trained using a dataset with per pixel labels indicating locations of salient objects within images. A binarized image can be generated, based on the output of the convolutional neural network, which indicates pixels within each image at which an object was detected. The generating of the binarized image can include changing pixels within a predefined Hue Saturation Value (HSV) range to a first value, and changing pixels outside the predefined HSV range to a second value.

Motion can be determined between two adjacent images in the feed. Such determination can use at least one machine learning model such as a convolutional neural network that produces a vector corresponding to an array of pixels indicating motion between the two adjacent images. Such a convolutional neural network can be trained using a loss function that encourages the convolutional neural network to learn a set of weights that minimizes a distance between outputs of the convolutional neural network and a ground truth optical flow. A binarized image can be generated based on the output of the convolutional neural network which indicates pixels within each image at which an object was detected.

The assigning can include determining a centroid of an object in each image, estimating a trajectory of the centroids of the objects in each image relative to one or more preceding images, and stopping tracking of the object when the estimated trajectory goes outside a corresponding image. An image in a trajectory of the object in which a centroid of an object is closest to a center of the image can be determined.

In some variations, images not meeting certain criteria can be filtered. For example, objects below or above a predetermined size can be filtered out as can images having objects outside a predefined trajectory and/or images of objects that are below a predefined sharpness level.

Certain aspects such as the detecting can be constrained within a region of interest of each image.

Further, in some variations, images can be filtered out which are similar to or unchanged from an image, of the same object, previously provided to the consuming application or process. Images that do not meet the predefined object representation parameters can be discarded.

In still another aspect relating to quality assurance, data is received that includes a feed of images of a plurality of objects passing in front of an inspection camera module forming part of a quality assurance inspection system. Thereafter, a presence of objects having a size within a predefined range are detected on an object-by-object basis. Each image in which the presence of the object is detected is provided, on an object-by-object basis, to a consuming application or process for quality assurance analysis.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter simplifies manufacturing, procurement and configuration of the hardware and software components required to install and obtain value from a camera-based quality assurance inspection system. The subject matter herein, also provides techniques which allow for the output of complex algorithmic processes such as machine learning models to be made understandable for non-technical users through visualizing anomalies and other aberrations of objects in images (such as objects advancing along a production line passing in front of an image sensor). These techniques allow users of camera-based quality assurance inspection systems to get up and running more quickly as well as monitor and maintain the performance of their production lines being inspected.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 8 is a diagram illustrating a composite object image of the overlays of FIGS. 6 and 7 as applied to the raw image of FIG. 5;

Like reference symbols in the various drawings indicate like elements.

DETAILED DESCRIPTION

Figure 1:
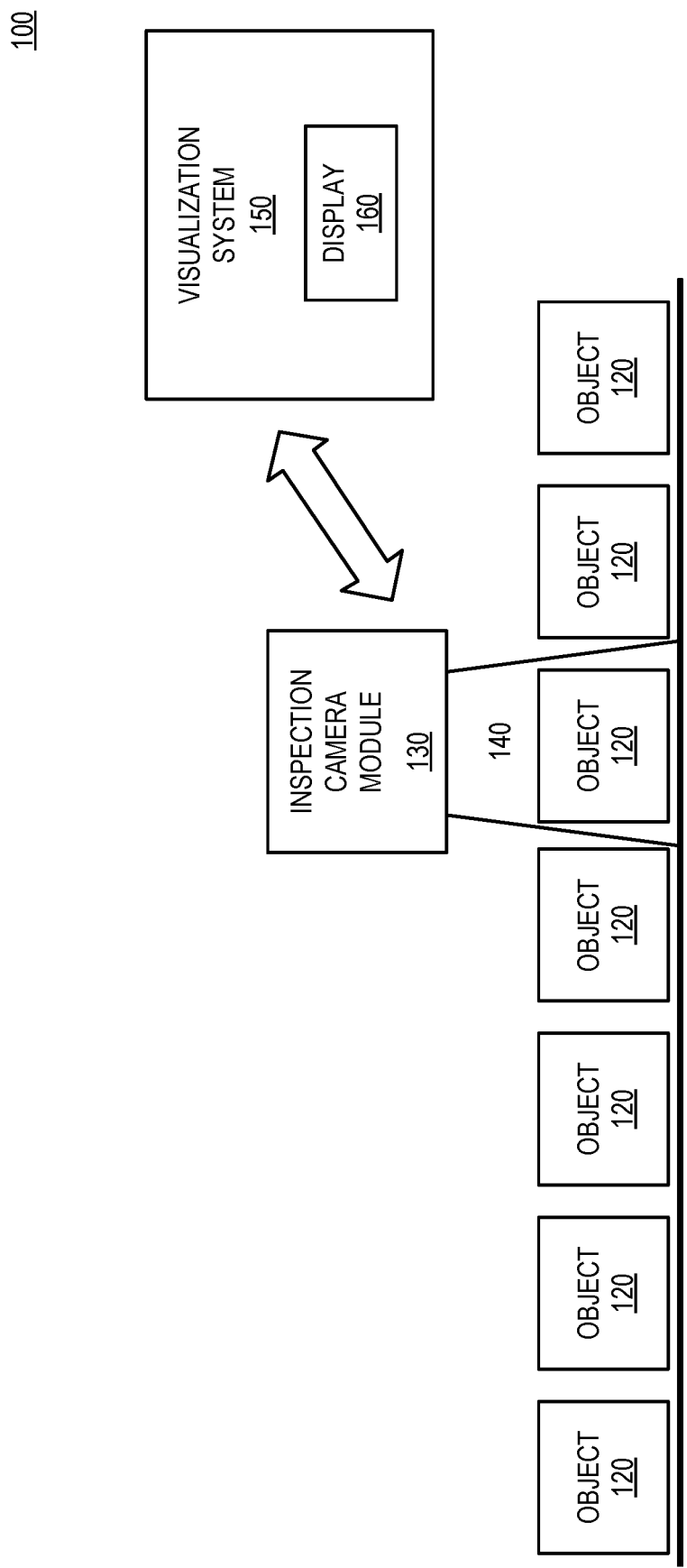
FIG. 1 is a diagram illustrating a production line system providing object anomaly visualizations.

The current subject matter is directed to identifying anomalous or other aberrations on objects within images with particular application to quality assurance applications such as on production lines, inventorying, and other supply chain activities in which product/object inspection is desirable. The techniques herein leverage computer vision, machine learning, and other advanced technologies. The techniques encompass both hardware and software methodologies with a shared primary goal of making camera-based quality inspection systems easier to use. Ease of use can be achieved through methodologies including removing the need for commonly used hardware components, including multiple variants of hardware components and allowing the user to switch between them via a software interface, and visualizing the output and/or decisions of complex algorithmic processes such as machine learning algorithms in order to make the system interface more interpretable to an average user.

Camera-based quality assurance inspection systems commonly utilize a hardware trigger input to the image sensor in order to capture consistent images of the product being inspected. As the object activates the hardware trigger, through methods such as but not limited to activating a mechanical switch or passing in front of a laser-based switch, the camera module receives this signal from the trigger and begins the process of capturing an image which is then made available to software such as a vision processing pipeline. While running in this mode, the sensor only produces images when the trigger is activated (i.e. if there is no product which is activating the switch, the sensor is not producing images). One ease-of-use technique provided herein removes the need to install such a hardware-based trigger and instead uses a software pipeline to determine the image which is closest to that which would have been generated if a hardware trigger were being used. The sensor runs in a continuous mode at close to its maximum frame rate and a software algorithm or plurality of algorithms monitors the continuous image feed from the sensor, identifies the optimal image or images that should be used to perform the quality assurance inspection task, and provides those selected images to the vision processing pipeline as if the inspection camera module were being run using a hardware trigger. This technique removes the need to provision, install and configure a hardware trigger.

Camera-based quality assurance inspection systems commonly utilize either global shutter or rolling shutter image sensors. Global shutter image sensors allow for all pixels in the image sensor to be exposed simultaneously, while rolling shutter image sensors typically can only expose a region of pixels, such as a row, column or quadrant at a time, scanning through all regions in series in order to obtain the final image. Exposure methodologies become significant when either the image sensor, the subject in the field of view of the image sensor, or both, are in motion for a period of time in which the image sensor is exposing, i.e. generating an image. It is typical in camera-based quality assurance inspection systems for the image sensor to be in a fixed position while the products in the field of view of the image sensor, such as items on a conveyor belt or other type of production line, are in motion. Utilizing a rolling shutter image sensor for typical camera-based quality assurance techniques can often lead to images which are either distorted or blurry compared to those taken from a global shutter image sensor. Global shutter image sensors are therefore typically preferable for camera-based quality assurance inspection systems, however they typically come at a significantly higher cost than rolling shutter image sensors with similar pixel counts and resolutions. Global shutter image sensors are also not commonly available in formats with full color resolution (RGB) and higher pixel densities (greater than 10 megapixels).

Camera-based quality assurance inspection systems commonly utilize a single image sensor in conjunction with some amount of computing hardware to process images from the sensor. These systems typically further include a feature which allows a user of the system to install, remove or change the lens being used in conjunction with the image sensor. Lenses typically have either a fixed or adjustable focal distance (a.k.a. zoom lens), where if the focal distance is adjustable, it is adjustable either through physical controls on the lens or through software controls which can be commanded by a user.

The lenses discussed above typically have manual focus control. The focus of the lens is typically adjusted by loosening a mechanism on the lens, adjusting a sliding lever or ring on the lens, and then tightening the mechanism that was originally loosened to lock the focus in place. This process is only possible when a user is physically in the same location as the inspection camera module, as the user needs to manually adjust the lens hardware on the inspection camera module. An ease-of-use improvement discussed below is to add a software-programmable focus assembly to the inspection camera module. The software-programmable focus assembly can be mechanically implemented through either a liquid lens assembly or a motorized assembly. In a motorized focus assembly, a linear actuator or motor, typically but not limited to a voice coil, stepper, or other piezoelectric technology, is seated between the image sensor and the lens, whereby software commands can change the displacement of the actuator and thereby change the working distance between the end of the lens and the image sensor. In a liquid lens software-controllable focus assembly, a software-controlled electrical or mechanical force is applied to an optical-grade liquid cell placed atop the end of a fixed-focus lens, which causes the cell's shape to distort slightly and thereby change the focal length of the overall lens assembly.

The focal properties of the lens, either having a fixed focal distance or an adjustable focal distance, where the adjustable focal distance can be controlled either physically or through software commands, and having focus control either through physical adjustment of lens hardware or through software commands, are referred to herein as the lens focal properties.

Lenses can be mounted to the image sensor using T-mount, C-mount, S-mount (a.k.a M12), CS-mount, F-mount, or other mounting standards. It is typical to use lenses with longer focal distances, including but not limited to 8 mm, 12 mm, 16 mm, 25 mm and 35 mm, in order to best concentrate the area of interest for inspection on the product on the pixels of the image sensor.

It is typically desirable to be able to change the focal distance of the lens being used, in order to be able to obtain the best possible image of the product being inspected, given a range of acceptable mounting locations for the image sensor and lens assembly, in order to maximize the number of pixels on the sensor which can cover the area of interest on the product to be inspected. As such, lens choice and system mounting location typically form a multivariable optimization problem in which the end user must find a decent optimum, where the system is mounted in an acceptable location and the lens chosen allows the system to perform its quality assurance inspections with acceptable performance. This optimization can be tedious and time-consuming for the end user, as they must have, at the time of setting up the system, a set of all possible lens options that can mount to the image sensor provided with the camera-based quality assurance inspection system. The user must then manually experiment with the different lens options, viewing the images produced for each option utilizing the camera-based quality assurance inspection system's user interface, determining the quality of the images produced for each option, and selecting the best option before configuring the remaining settings of the system. Each time a lens is removed and attached, the user also faces risk of allowing dust or debris to ingress onto the image sensor and/or for other mechanical damage to occur either to the lens or image sensor assemblies. An ease-of-use technique discussed below includes a camera-based inspection system which contains multiple instances of image sensors in which the sensors themselves are typically but not always identical such that each sensor is directly integrated with a lens with a differing lens focal properties. The assembly of a single image sensor and a single lens, with the lens a set of lens focal properties is referred to herein as an inspection camera module. The system contains enough instances, typically two or more, of inspection camera modules, each with differing attributes, with the differing attributes being either a different image sensor or a lens with different lens focal properties, to allow the user to typically find a suitable combination without needing to physically change or experiment with any hardware components of the system such as lenses. The user can perform this experimentation either in the same location as the camera or remotely via an IoT connection, i.e. without having to be in the same location as the system. For remote, i.e. IoT experimentation, the user can use software commands to choose which inspection camera module they wish to be used as input to the vision processing pipeline. The user can also use software commands to adjust the focus of the inspection camera module if the lens focal properties of the inspection camera module support software-controllable focus. The user can further view the images produced by each sensor and lens combination independently, simultaneously, or otherwise via the user interface for the system to allow them to quickly find the optimum combination of sensor, lens and mounting location to allow them to proceed to the remainder of product configuration.

As mentioned above, camera-based quality assurance inspection systems commonly utilize a single image sensor. These systems commonly utilize a hardware trigger mechanism in which the image sensor only produces images when a trigger is activated. In addition, it is typical to use lenses with long focal distances and therefore narrower fields of view, in order to best utilize the entire array of pixels on the image sensor to perform the quality assurance inspection analysis. Due to these factors, it is often difficult for a user, when viewing the sequence of images being produced by the inspection camera module, henceforth referred to herein as the video feed, to determine the overall state or status of the region including and surrounding the area in which the camera is inspecting. There may be multiple challenges, one of which being a faulty or otherwise non-functioning hardware trigger, due to either issues with the trigger itself, cabling, the placement of the product with respect to the trigger, or otherwise, which causes the image sensor to not produce images. Another challenge may be a long focal distance lens which does not provide a wide enough field of view for a user to obtain contextual information about the area surrounding the product or region being inspected so as to allow the user to diagnose issues in their production system that are adjacent to or closely surrounding the field of view of the inspection camera module. Examples of such issues are toppled or fallen products, clogged or otherwise stopped or backed up conveyance systems, or incorrect or missing products. An ease-of-use technique discussed below involves including at least one additional inspection camera module with an inspection system, henceforth referred to herein as the overview inspection camera module, which utilizes a lens with a shorter focal distance, such as 4 mm or less, thereby providing a wider field of view. The field of view of the overview inspection camera module typically encompasses and exceeds that of the non-overview inspection camera module or modules, referred to herein as detail inspection camera module or modules. The user is able to, the system's user interface, view the video feed from this overview inspection camera module either in replacement of or in parallel to the detail inspection camera module or modules. The overview inspection camera module typically runs in a continuous trigger mode, i.e. producing images and therefore a video feed, at a sufficiently high frame rate such as 30, 60 or 120 frames per second (FPS). A camera-based quality assurance inspection system with this additional overview inspection camera module is thereby able to show to the user the context around the item or product being inspected so that they may either obtain peace-of-mind or troubleshoot issues arising nearby to the inspection camera.

The overview inspection camera module can also be used as an input, either in parallel to or as a replacement for the detail inspection camera module or modules, to the vision processing pipeline of the system. This allows a user to define inspection configurations based on the overview inspection camera module and accomplish all of the other functionality of the system using the images generated from the overview inspection camera module in parallel to or replacement of the detail inspection camera module or modules.

A camera-based quality inspection system, referred to herein as a camera system, comprises the combination of one or more inspection camera modules, where the inspection camera modules are either detail inspection camera modules and/or overview inspection camera modules, and a computing device, where the computing device can either be a processor, microprocessor, FPGA, and the like.

A camera system may utilize one or more inspection camera module or modules, where the inspection camera module or modules are either detail or overview inspection camera modules as previously defined, to produce images which are then input to a vision processing pipeline, where in the vision processing pipeline the images are analyzed by inspection tools which utilize computer vision or machine learning algorithms to determine quality assurance metrics with respect to the images, where these metrics are then utilized by the vision processing pipeline to make pass or fail decisions based on user configurations, where these pass or fail decisions are then optionally reported to any, all or none of (a) the user via the user interface (rendered on a GUI of a display device), where the user and interface are either co-located or remote, (b) a cloud or local database, (c) the factory or production line generating the items being inspected via a Programmable Logic Controller (PLC) or other similar communications equipment and/or interface.

The computer vision and/or machine learning algorithms utilized in such a system typically perform complex mathematical processes in order to determine the quality assurance metrics associated with a given image. These mathematical processes typically involve receiving a two-dimensional or three-dimensional image as an input, performing mathematical operations on the image or regions of the image, and then producing a series of quality assurance metrics as output, where one of the metrics is typically a "pass" or "fail" decision for the image being inspected. The process of converting these multi-dimensional image inputs to a "pass" or "fail" output through complex mathematical algorithms, while performant, can leave a user wondering how the algorithm arrived at its conclusions.

An ease-of-use technique discussed below involves the computer vision or machine learning algorithm, referred to herein as the inspection tool, to return a multi-dimensional image, referred to herein as an overlay as one of its quality assurance metrics, whereby the image can be overlaid atop or otherwise combined with the original input image, and whereby displaying this image to the user allows the user to better understand the decision-making process or outputs of the inspection tool with respect to the item being inspected. Each pixel in the overlay image can have color (e.g. RGB, HSV) and optional transparency (e.g. alpha) information, so that it can indicate to the user, when combined with the original input image, additional information as to the quality assurance metrics produced by the tool. This overlay may be rendered in real-time atop the inspection camera module's video feed and shown to the user in a user interface. This overlay may also be stored in a database and shown to the user either immediately after being produced or at a later date and/or time. An example of this overlay may be a "heat map" generated by an anomaly detection machine learning algorithm, where the overlay may contain larger densities of colored pixels, and where the pixels may have transparency (alpha) values which are less transparent and therefore more prominently visible, in regions of the input image which the machine learning algorithm believes to have most contributed to the "pass" or "fail" decision. Another example of this overlay may be a rectangular shape, referred to herein as a bounding box, generated by an algorithm performing optical character recognition (OCR), which encompasses the region in the image which contains text which the algorithm has been able to read or scan.

FIG. 1 is a diagram 100 illustrating an example production line 110 in which there are a plurality of objects 120 which pass within the field of view 140 of an inspection camera module 130. The inspection camera module 130 can be either the detail inspection camera module or modules, or the overview inspection camera module. The production line 110 can, for example, include a conveying mechanism (e.g., belt, etc.) as part of one or more manufacturing and/or quality assurance processes that is configured such that each of the objects 120 pass through the field of view 140 of the inspection camera module 130. The production line 110 can alternatively include a camera mounted in a fixed location in front of which an operator manually places a product in lieu of a conveying mechanism. A visualization system 150 can comprise one or more computing devices and electronic visual display 160. The visualization system 150 can either obtain data locally from the inspection camera module 130 or remotely through an IoT connection to the connected inspection camera module 130. The IoT connection can be facilitated directly in a peer-to-peer fashion or through cloud servers. The electronic visual display 160 can render one or more graphical user interfaces which, as will be described in further detail, can visualize the objects 120 as they pass within the field of view 140 along with an overlay comprising complementary information generated by one or more image analysis inspection tools. The visualization of the object along with the overlay is sometimes referred to herein as a composite object image 170. The complementary information can take varying forms including, for example, position information (e.g., location of barcodes, location of text, locations of features, locations of components, etc.), defect information (e.g. the location, size, severity, etc. of imperfections identified by the image analysis inspection tools), or variations in aspects of the objects such as dimensions, coloring, and the like which may potentially make the object less desirable according to various quality assurance assessments. The complementary information can be delivered in an image-based format with red, green, blue and alpha channels so that the tool can return a fill-color image with optional transparency. While the example of FIG. 1 illustrates as single inspection camera module 130 and a local visualization system 150, it will be appreciated that multiple inspection camera modules 130 can be utilized and the graphical user interfaces can be rendered on various local and remote computing devices either in real-time/near-real time as well as on-demand (i.e., historical data can be reviewed, etc.). Historical data can be saved locally on the camera system 130 and/or stored in a cloud database.

Figure 2:
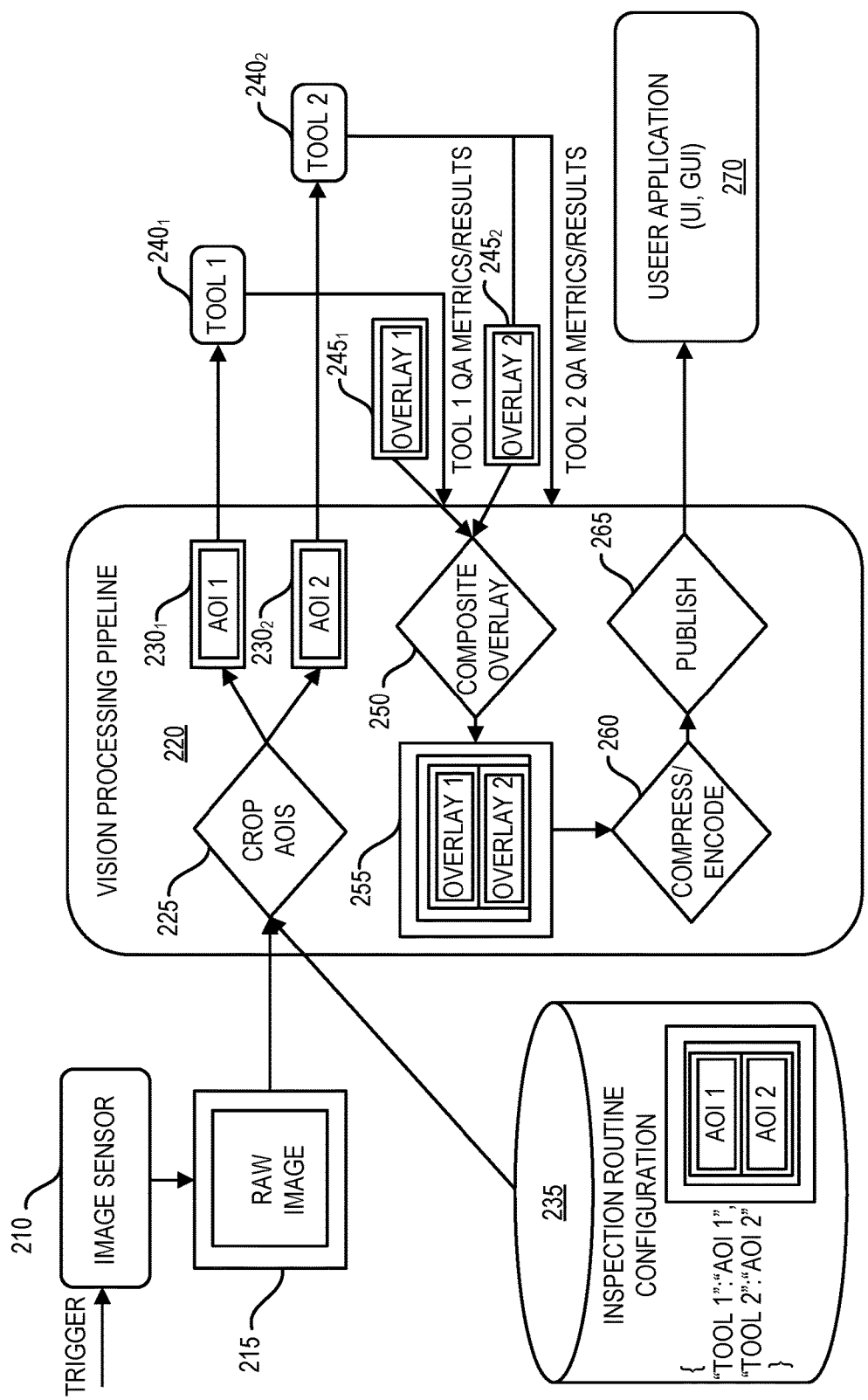
FIG. 2 is a diagram illustrating a first image processing workflow.
Figure 3:
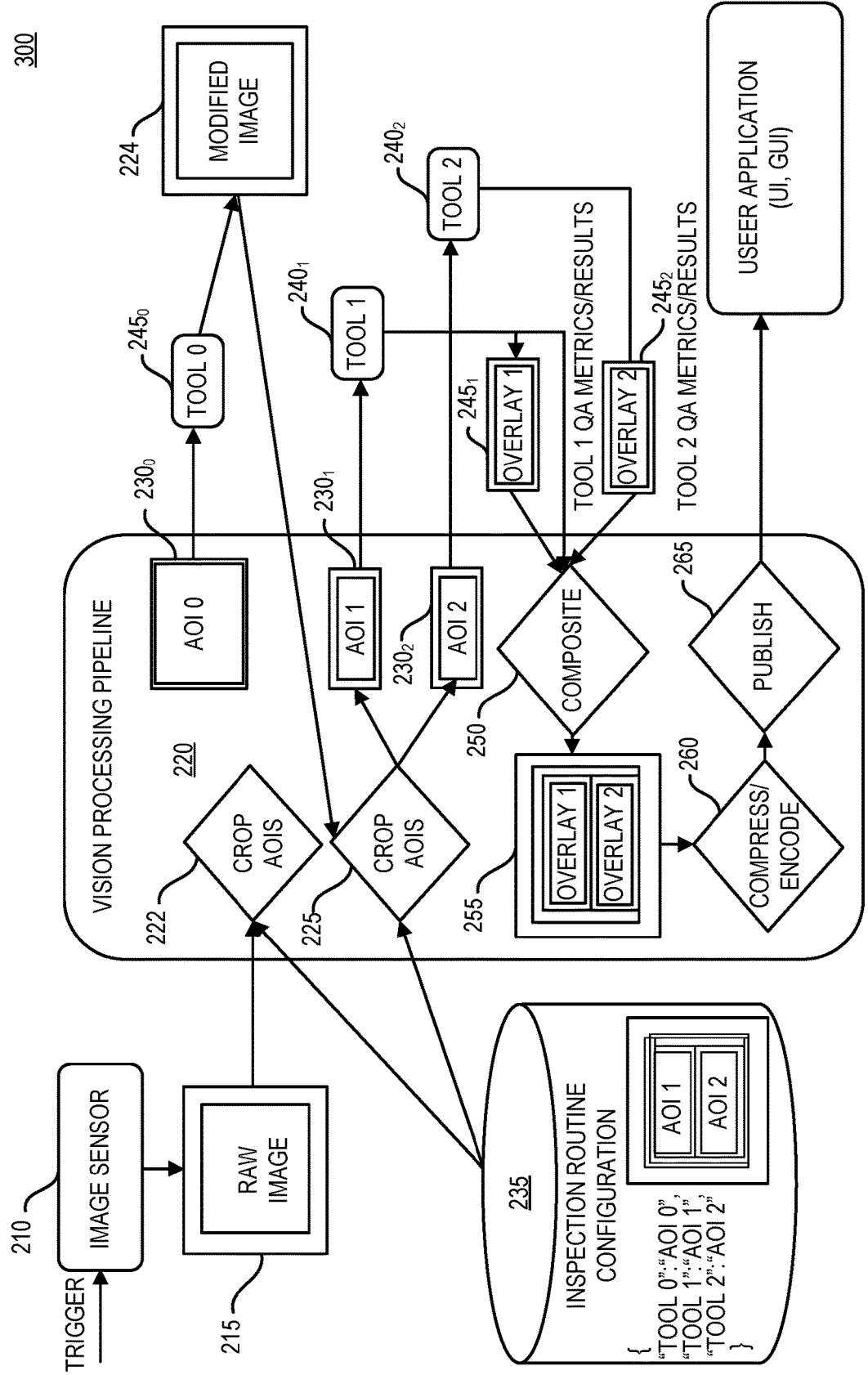
FIG. 3 is a diagram illustrating a second image processing workflow.
Figure 4:
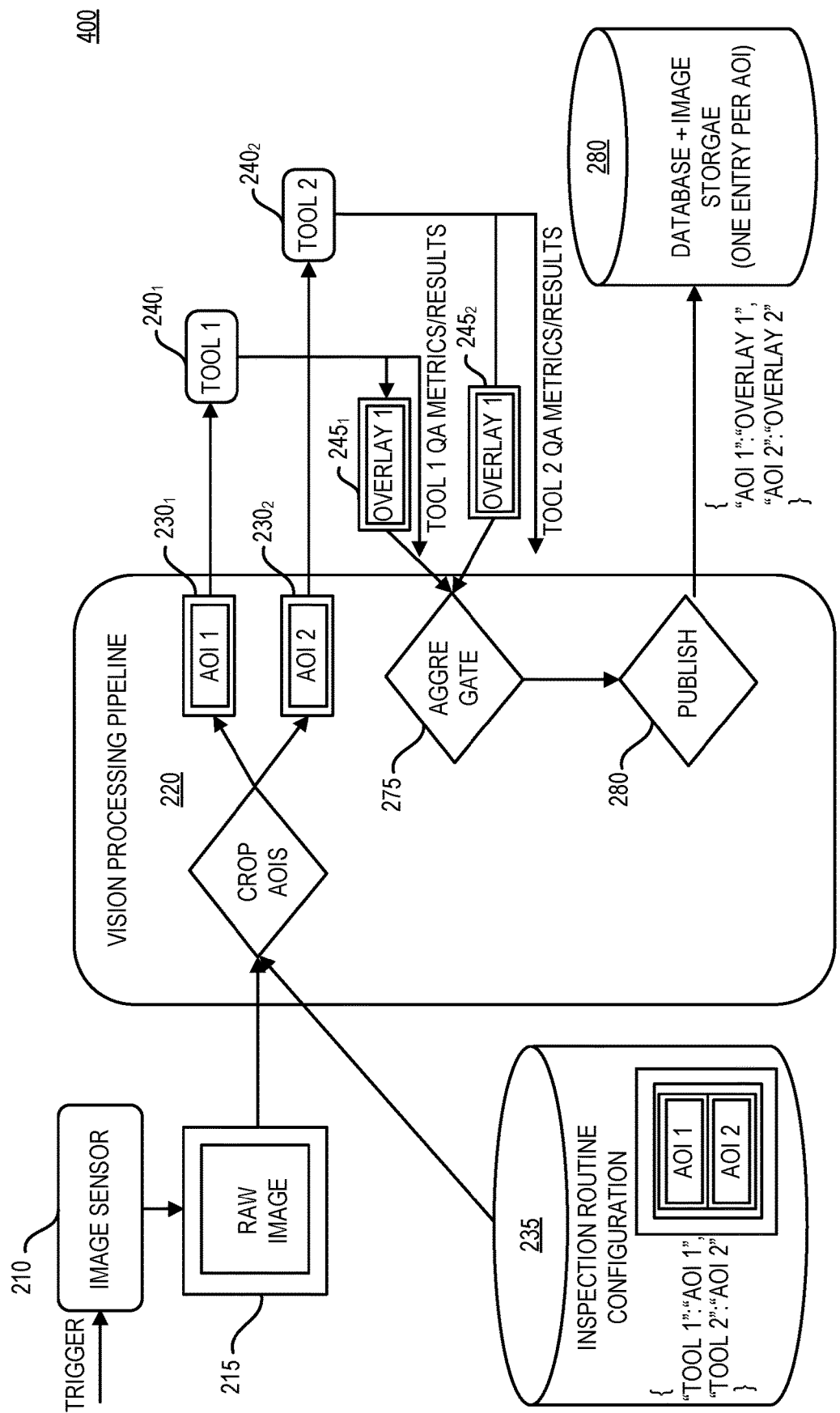
FIG. 4 is a diagram illustrating a third image processing workflow.

FIGS. 2-4 are diagrams 200-400 illustrating example object analysis and visualization workflows. With reference to FIG. 2, the inspection camera module, which can be either the detail inspection camera module or the overview inspection camera module, 210 generates a raw image 215 which, in some cases, can be part of a feed of raw images that correspond to objects to be analyzed or otherwise inspected. In some cases, there can be a mechanical (e.g., switch, etc.) and/or electromechanical (e.g., light source and corresponding sensor, etc.) trigger which causes the image sensor 210 to capture an image of a corresponding object as described above. A vision processing pipeline system 220 receives the raw image 215 and selectively (and optionally) crops 225 aspects of the image based on areas of interest (AOIs) to result in two or more AOIs $230_1$, $230_2$.

Aspects which define the boundaries of the AOIs (which can be static or dynamic based on the particular raw image 215) can be specified within an inspection routine configuration 235. An AOI as used herein can be specified as a region (x, y, width, height) within an image that should be further analyzed. In some cases, if there are multiple AOIs, one or more of such AOIs can overlap.

The inspection routine configuration 235 can also specify which of image analysis inspection tools $240_1$, $240_2$ is to analyze the corresponding AOI of the raw image 215. The vision processing pipeline 220 can cause the AOIs $230_1$, $230_2$ to be respectively passed or otherwise transmitted to or consumed by the different image analysis inspection tools $240_1$, $240_2$. Each of the image analysis inspection tools $240_1$, $240_2$ can generate information complementary to the object within the raw image 215 which can take the form of a respective overlay $245_1$, $245_2$. Such complementary information can take various forms including, for example, various quality assurance metrics such as dimensions, color, and the like as well as information as to the explainability of the decisions by the image analysis inspection tools $240_1$, $240_2$ (e.g. why a machine learning model believes an item to be defective and/or to the extent of the defective region found on the product, etc.)

The vision processing pipeline 220 can generate a composite overlay 250 based on the respective overlays $245_1$, $245_2$. The weighting and/or transparency in which the overlays $245_1$, $245_2$ can be combined can be prespecified in some cases. The vision processing pipeline 220 can then combine the composite overlay 250 with the raw image 215 to result in a composite object image 255. That composite object image 255 can then be compressed or otherwise encoded 260 and then published 265 for access on a user application 270 (e.g., GUI, UI of an application executing on a computer device, etc.). This access can be performed locally, i.e. directly between a computing device and the camera sharing a network or remotely, facilitated through IoT mechanisms. In some cases, the user application 270 can correspond to a product line visualization system such as in FIG. 1.

With reference to diagram 300 of FIG. 3, the interrelationship amongst the image analysis inspection tools $240_1$, $240_2$ can vary such that, in some arrangements, the output of a first image analysis inspection tool $240_o$ is used by one or more other image analysis inspection tools $240_1$, $240_2$. In particular, FIG. 3 illustrates a variation in which the raw image is first cropped 222 into various AOIs as specified by the inspection routine configuration 235 resulting in a first AOI $230_0$. Thereafter, an image quality inspection tool $245_0$ can perform some operations on the image (e.g., alignment, etc.) to result in a modified image 224. This modified image 224 can be similar in size to the raw image 215, and can be used as a substitute for the raw image 215 when cropping AOIs for all image analysis inspection tools 240 which are marked as dependent on another image analysis inspection tool as specified by the inspection routine configuration 235 (i.e., the inspection routine configuration 235 can specify a hierarchical arrangement between the image analysis inspection tools 240 so as a dependency tree). This modified image 224 is then subsequently cropped 225 and the workflow continues in a similar manner to that of FIG. 2. Referring still to FIG. 2, the image analysis inspection tool $240_0$ can perform an alignment in which the raw image 215 is compared to a reference image 215 (corresponding to the same object), specified in the inspection routine configuration 235. The alignment operation causes the raw image 215 to be corrected through pixel shifts and warps to more closely match the reference picture and therefore allow the AOIs to, when cropped, to match the desired intent of areas to be inspected.

FIG. 4 is a diagram 400 that illustrates a variation in which all of the activities of FIG. 2 or 3 may or may not be performed (not shown), and the publish operation 280 optionally includes saving the complementary information to a database so that it may be queried by lookups including but not limited to item unique identifier, AOI unique identifier, or tool result unique identifier. The database may either be on the same computer as the camera, on the same network, or connected over an IoT or other network in the cloud. Users can then use the UI to query the database when reviewing historical records from the system and view the individual complementary information/overlays on a per-AOI basis.

Figure 5:
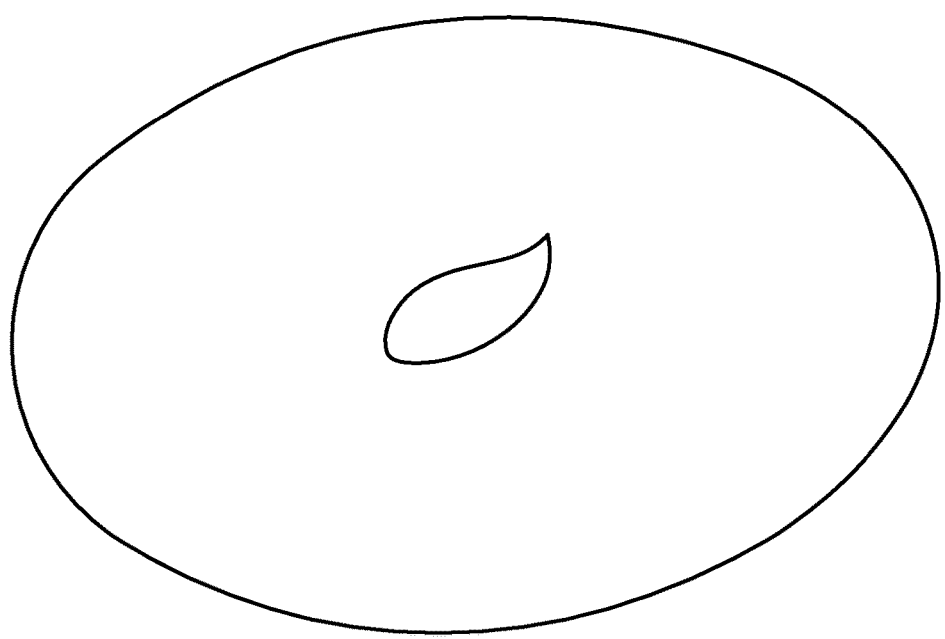
FIG. 5 is a diagram illustrating a sample raw image.

FIG. 5 is a diagram 500 illustrating a sample raw image. The raw image comes either directly from an image sensor (forming part of an inspection camera module) or from a software algorithm or set of algorithms that is monitoring the frames from the image sensor and then re-publishes them either in their original or a modified format. The raw image can contain a single instance of a product per frame or multiple instances of a product per frame. A product may be either well-defined, as in FIG. 5, or inconsistently defined, e.g. a volume of granola consisting of multiple composite ingredients (e.g., oats, fruit, nuts) and arranged in a nonuniform fashion.

Figure 6:
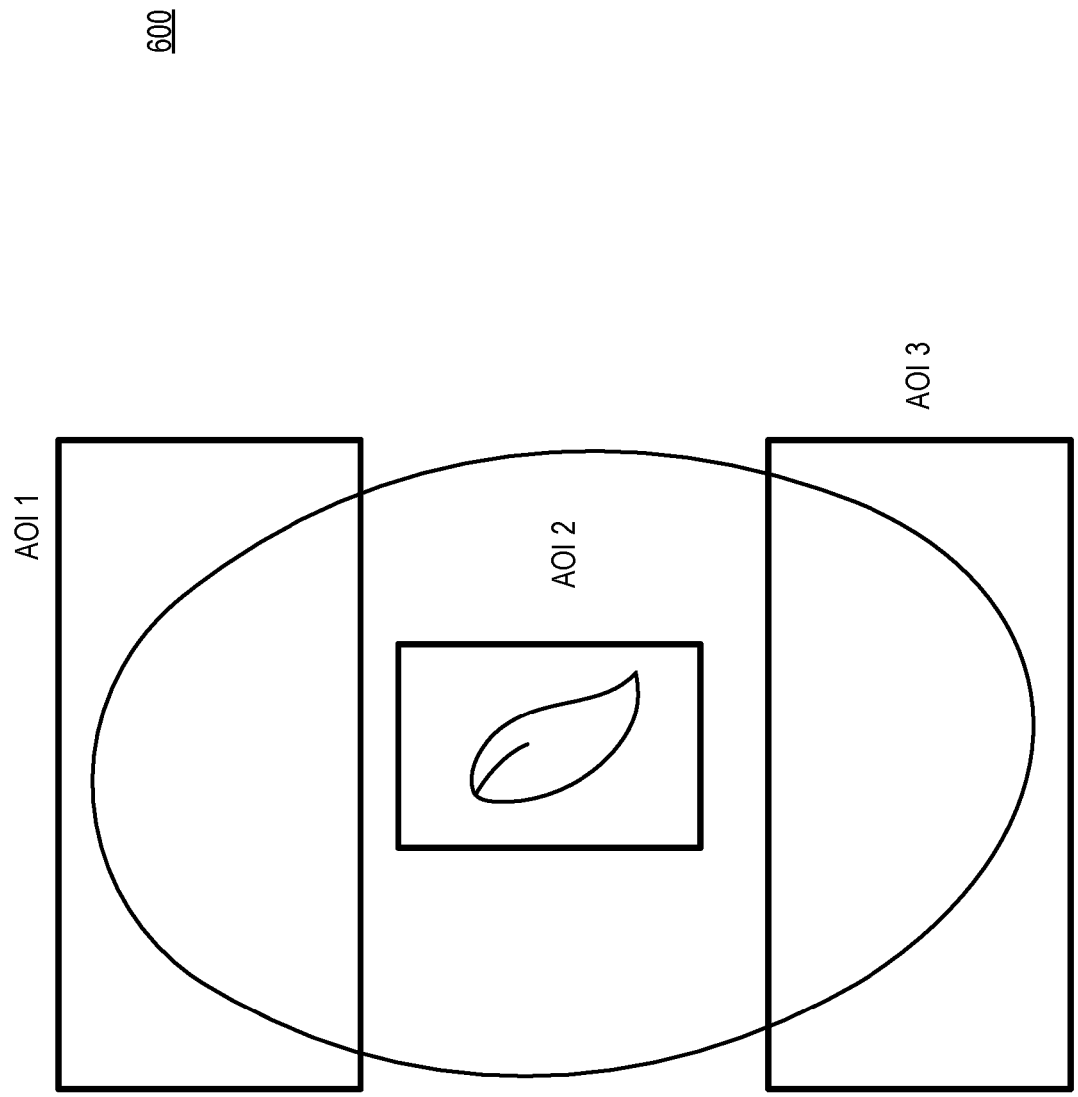
FIG. 6 is a diagram illustrating a first overlay for the raw image of FIG. 5.
Figure 7:
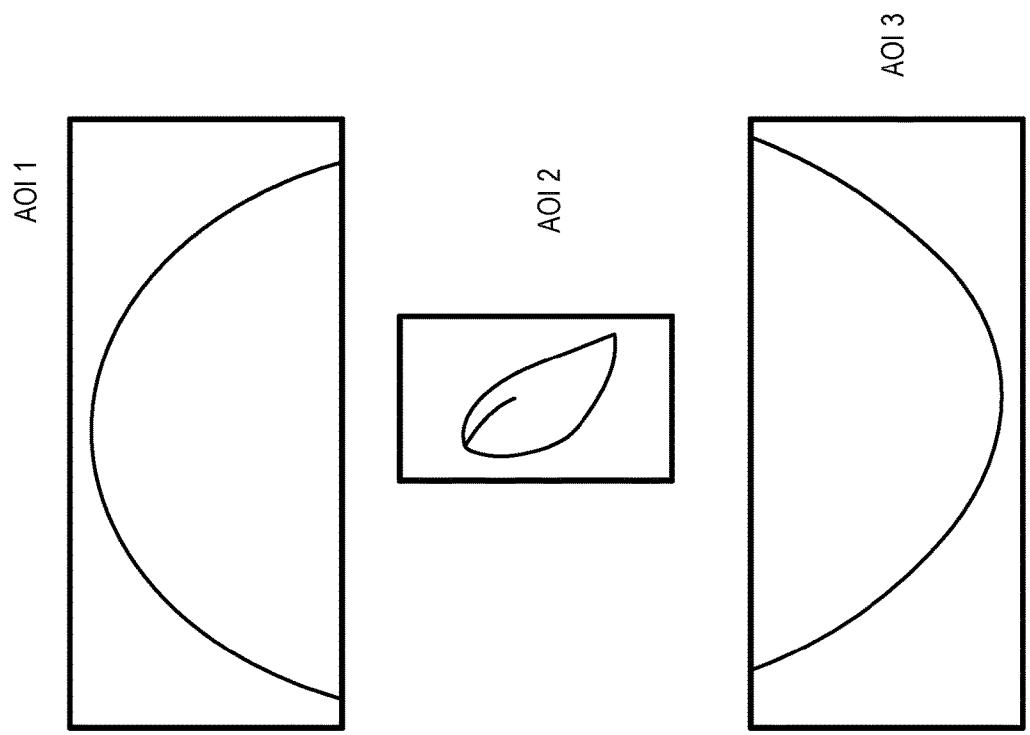
FIG. 7 is a diagram illustrating a second overlay for the raw image of FIG. 5.

FIG. 6. is a diagram 600 illustrating three AOIs overlaid on the raw image from FIG. 5. When the image processing pipeline inspects an item such as shown in FIG. 5. it will first use these AOI bounding boxes to crop out the regions of the raw image which they encompass. Each AOI will then be sent to an inspection tool for analysis. FIG. 7. is a diagram 700 showing the cropped AOIs corresponding to FIG. 6.

FIG. 8 is a diagram 800 illustrating example overlays for the raw image of FIG. 5. Overlays 1 and 3, corresponding to AOIs 1 and 3 in FIG. 7, respectively, show a highlighting pattern which identifies to the user areas within the AOI that the inspection tool believes to be of significance. The significance could be to indicate regions which, for example, a machine learning model believes to be defective, thereby allowing the model to explain its prediction. The significance, alternatively, could be to highlight regions of the AOI which the user has requested the model to identify and confirm to be present. The highlighting pattern may be of any color and any transparency in order to convey the intent of the significance to the user. The color red is typically used to indicate regions which the model believes to be defective and the color green typically used to indicate regions which the model believes to be correct. Overlay 2, corresponding to AOI 2, shows an outline which encompasses a region within the AOI so as to call the user's attention to the region. The outline shown is rectangular, but the outline used may be of any shape or size so long as it encompasses a region of the AOI and is fully contained within the AOI. The outline can be any color and any transparency. Red is typically used to indicate failure, while green used to indicate success, but the color is not limited to these options.

Figure 9:
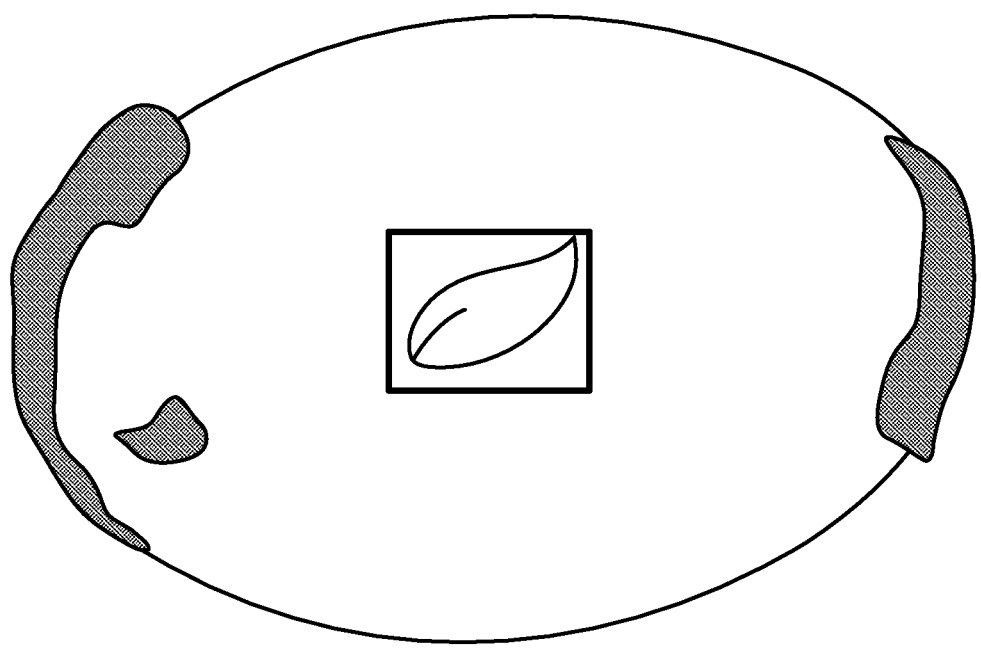
FIG. 9 is a diagram illustrating the composite object image in FIG. 8 as part of a dashboard rendered by a visualization system.

FIG. 9 is a diagram 900 illustrating a composite object image of the overlays of FIGS. 6 and 7 as applied to the raw image of FIG. 5. When presented in this fashion, it becomes more clear to the user which factors contributed to an inspection tool's decision to pass or fail an object being inspected. The user can then quickly confirm on the physical product if indeed the regions identified in the overlays are as the model believes them to be.

Figure 10:
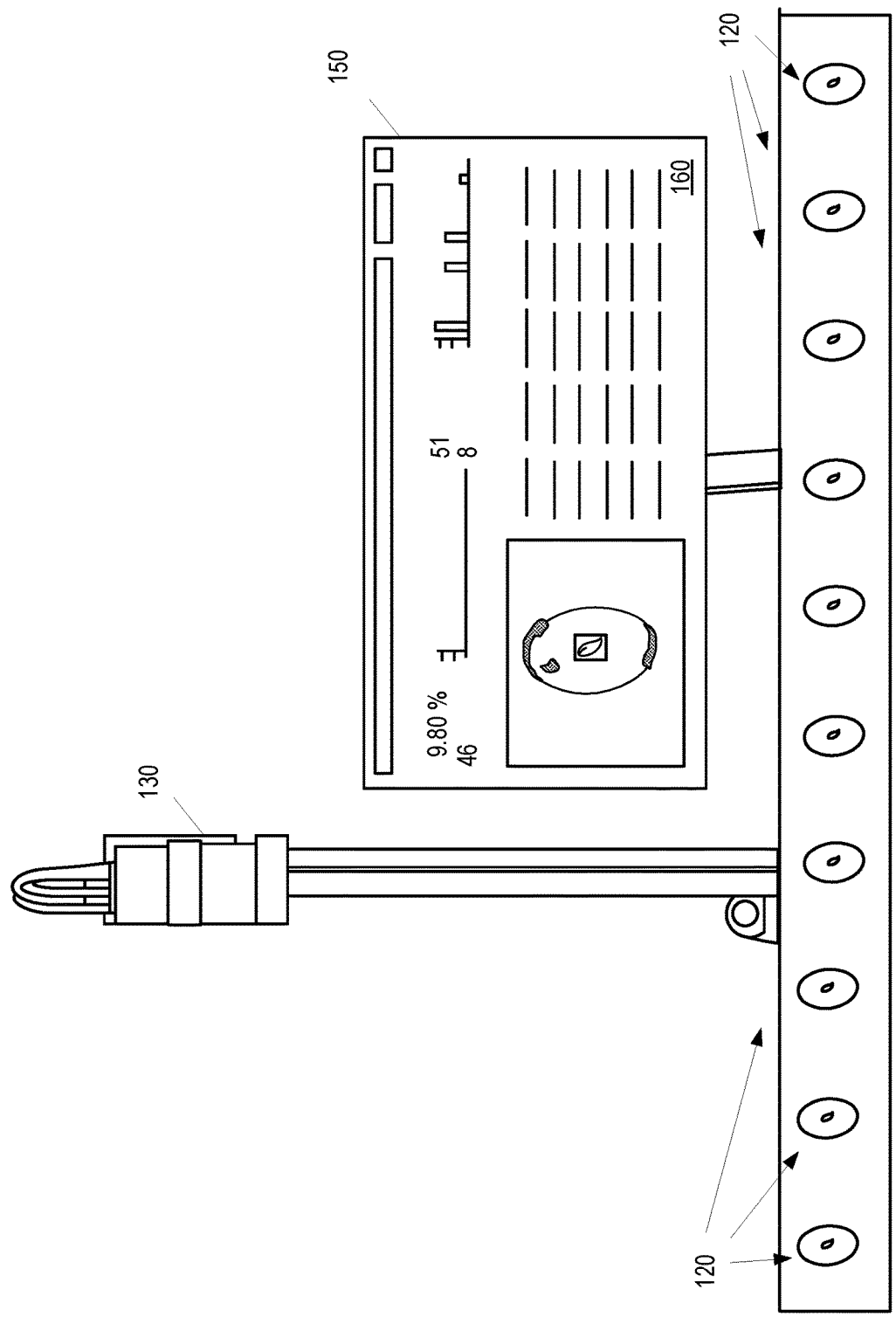
FIG. 10 is a process flow diagram for providing object analysis and visualization for quality assurance purposes.

FIG. 10 is a diagram 1000 illustrating the composite object image in FIG. 9 as part of a dashboard rendered by a visualization system 150 on a display 160. The dashboard is shown physically close to the inspection camera/image sensor 130, but the dashboard can also be viewed from any internet-connected device remotely. The objects 150 pass along a conveyance mechanism in front of the inspection camera module 130. In real-time, as images pass in front of the inspection camera module 130, the raw images are passed through the vision processing pipeline 220 to the tools and the output composite image is visualized on the display 160. The views can be shown for each frame/object 120 which is inspected, but may skip objects 120 due to processing or internet bandwidth limitations. The images shown on the display 160 can also be saved to a database, either locally or in the cloud, to allow the user to review the data historically at a later time.

The image analysis inspection tools 240 can take various forms including, for example, computer vision or machine learning algorithms whose function is either to modify the raw image for the purpose of allowing other tools to inspect it, or which consume an AOI and provide quality inspection analysis and complementary information back to the vision processing pipeline (such as tools $240_1$ and $240_2$) in FIG. 3. Example image analysis inspection tools 240 can include or otherwise execute one or more of an alignment algorithm, either computer vision (CV) or machine learning (ML)-based, which takes the raw image along with a reference image configured in the inspection routine configuration 235 which then applies shift, warp, translate or similar operations to conform the content of the raw image so that it more closely resembles the reference image in the inspection routine configuration 235; a color filter algorithm which converts the color space, perhaps using a HSV or RGB filter, to a monochrome image space; or algorithms which sharpen or blur the content of the image.

Image analysis inspection tools can be configured by the user. A part of the configuration may be an image or set of images, referred to herein as reference image or images, which the user believes are standard, typical, or otherwise exemplary images of the product with respect to the total corpus of images which may be obtained of the product during the quality assurance inspection application. Further, a part of the configuration may be an image or set of images, referred herein to as the training image or images, which the user labels or otherwise marks, which are to be used in conjunction with an image analysis inspection tool which, as part of its configuration, requires the training of a computer vision or machine learning model. A user label or mark on the training images may be "pass" or "fail" to indicate if the image is that of a product which should be considered to be passing or failing by the image analysis inspection tool. The label or mark may also be that of a particular class, where a class may be a single descriptor that is a member of a set of descriptors which can be used to describe an image of the product being inspected. An example of a class may be "A", where the set of classes may be ["A", "B", "C"], if the image analysis inspection tool is being configured to determine if product variant "A", "B", or "C" is present in the image.

When an image analysis inspection tool 240, which has been configured with a reference image or images, a training image or images, or all of the preceding, is producing quality assurance metrics on an image or feed of images 215, it is optimal for the image or feed of images 215 to be visually similar to the reference image or images and/or the training image or images. The closer the visual similarity between the image 215 and the reference and/or training images, the more likely the image analysis inspection tool will perform its function properly. Machine learning models, in particular, can often perform poorly on "out of sample" images, where "out of sample" images are images on which the model has not been configured or trained. It can be useful to come up with a score, hereafter referred to as the "visual similarity score", which can be a floating-point or integer number which represents how similar an image 215 is to the set of reference and/or training image or images on which the image analysis inspection tool was configured. The visual similarity score may be measured through a variety of methods. One basic method may be a mathematical algorithm which analyzes the average color value of the pixels of the image 215 and compares this to the average pixel value of the training and/or reference image or images to determine the score. Another more advanced method may utilize a statistical model to generate a probability that the image 215 is a member of the distribution of reference and/or training images on which the image analysis inspection tool has been configured, where this probability or a linearly scaled representation of the probability, may then be used as the visual similarity score. The visual similarity score may be used as an input to the inspection tool 240, but it may also be used in other areas within the vision processing pipeline, such as software-based trigger module as described below.

The image analysis inspection tools 240 implement a standardized application programming interface (API) for receiving commands and input data, such as AOIs 230, from the vision processing pipeline 220, and returning quality assurance metrics and results including overlays 245. The image analysis inspection tools 240 can each run in their own host process or thread on the camera system compute and the API utilizes inter-process communication methods to be able to transfer the commands and data between the vision processing pipeline 220 and the image analysis inspection tools 240. Inter-process communication methods include but are not limited to shared memory, pipes, sockets (TCP, UDP or linux), kernel data structures such as message and event queues, and/or files. Any image analysis inspection tools 240 which conforms to and implements the specified API which the vision processing pipeline 220 expects, utilizing the specified inter-process communication mechanism, can be used to analyze the corresponding AOI of the raw image 215 and return quality assurance metrics including overlays 245. Further, the tools can be fully containerized, in which the tool implementation, referred to herein as software code, runtime requirements and dependencies, and associated metadata for the image analysis inspection tools 240 are developed and downloaded or otherwise loaded onto the camera system fully independently from the remainder of the vision processing pipeline 220. Containerization of the tool implementation can utilize technologies such as docker, lxc, or other linux containers to package the software code and dependencies. The associated metadata portion of the tool implementation may include a single file or set of files, where the file may be any format but may specifically be a compressed or uncompressed archive format such as .zip, .tar or .7z. When the vision processing pipeline 220 is commanded to begin inspecting raw images 215, it first checks the inspection routine configuration 235 to determine which tool implementations are required for the image analysis inspection tools 240 specified. If the tool implementations are present on the camera system, as determined by querying a local data store, then the vision processing pipeline begins a new process or thread for each image analysis inspection tools 240, where the new process or thread runs, as defined in the tool implementation, the software code, utilizes the runtime requirements or dependencies, and may reference and utilize the associated metadata file or files. If the tool implementations are not present on the camera system, the vision processing pipeline 220 can choose to download them from a cloud server if possible, else the vision processing pipeline can return an error and indicate as such to the user. The user interface for the camera system additionally allows a user to download or otherwise load the tool implementation for a given tool which they have configured onto a camera system on which they would like to run the tool. Through this system, it is possible to allow developers (e.g. software engineers, end users, etc.) to create and distribute tools for use in the vision processing pipeline 220 without those application developers needing to also be developers of the vision processing pipeline 220, employees of the company or team which develops the vision processing pipeline 220, or otherwise associated at all with any entity which maintains, develops or implements the vision processing pipeline 220. As long as the image analysis inspection tools 240 are containerized as specified and implement the expected API via the IPC mechanisms, they may be fully used and utilized in the vision processing pipeline 220.

Additional examples of quality inspection tools 240 can include: a machine learning model which uses convolutional neural network (CNN) techniques to provide anomaly detection analysis based on images which the user has labeled (referred to herein as Tool A), a machine learning model which uses CNN techniques to provide pass-fail analysis based on images which the user has labeled (referred to herein as Tool B), a machine learning model which uses CNN techniques to provide class presence/absence determinations based images which a user has labeled and then compare the detected classes to those that the user expects as configured in 235 in order to create a pass/fail determination (referred to herein as Tool C), a machine-learning or computer-vision based optical character recognition (OCR) which is configured to detect text in in image and compare the scanned text to that which the user has specified in the inspection routine configuration 235 to be expected (referred to herein as Tool D); a machine-learning or computer-vision based barcode detection algorithm which is configured to scan barcodes, QR codes, data matrices, or any form of 2-D code and compare the code scanned to that which a user has specified in the inspection routine configuration 235 to be expected (referred to herein as Tool E); a computer-vision based algorithm which has been configured to check for the presence or absence of pixels of a particular color that passes or fails depending on the expected volume as specified by the user in the inspection routine configuration 235 (referred to herein as Tool F).

Tool A, in addition to being able to identify anomalies, can indicate the location of the anomalies in the raw image without being trained on pixel-level labels. Pixel-level labels are time consuming to produce as a user must manually mark the pixels in which the defects occur for every image in the dataset. As opposed to most CNN-based approaches that use an encoder architecture that transforms a 2D input image into a 1D embedding, a fully convolutional network can be utilized. A fully convolutional network (sometimes referred to as FCN) is a neural network as used herein can be primarily composed of convolutional layers and no linear layers. This fully convolutional network maintains the natural 2D structure of an image with the output embedding of the network such that when distance comparisons between embeddings and a learned centroid embedding are calculated, the larger elements of the 2D distance array indicate the region in the raw image of the defect. In addition to this architecture, a contrastive loss function can be utilized that allows for training the network on only nominal data, while also leveraging anomalous data when it is available. The contrastive loss function trains the network in a manner where the network is encouraged to place nominal samples near the learned centroid embedding and anomalous samples far away. By using these approaches, an overlay image can be produced that indicates an anomaly score for each pixel in the raw image.

Tools B and C can utilize transfer learning and self-supervised learning where a CNN model trained on a separate task is adapted to the task at hand. This allows one to use much less data than if the model has been trained from scratch. Given this pretrained model, earlier layers can be reused and additional linear layers that are designed for the new task can be appended. In order to produce overlay visualizations, the regions in the raw image that contributed most to the prediction of the model can be identified.

For tools D and E, the overlay can indicate the region of the image that the text or barcode was found can be indicated using a bounding box.

Tool F can produce an overlay visualization based on the regions of the raw image that match the configured color range.

Figure 11:
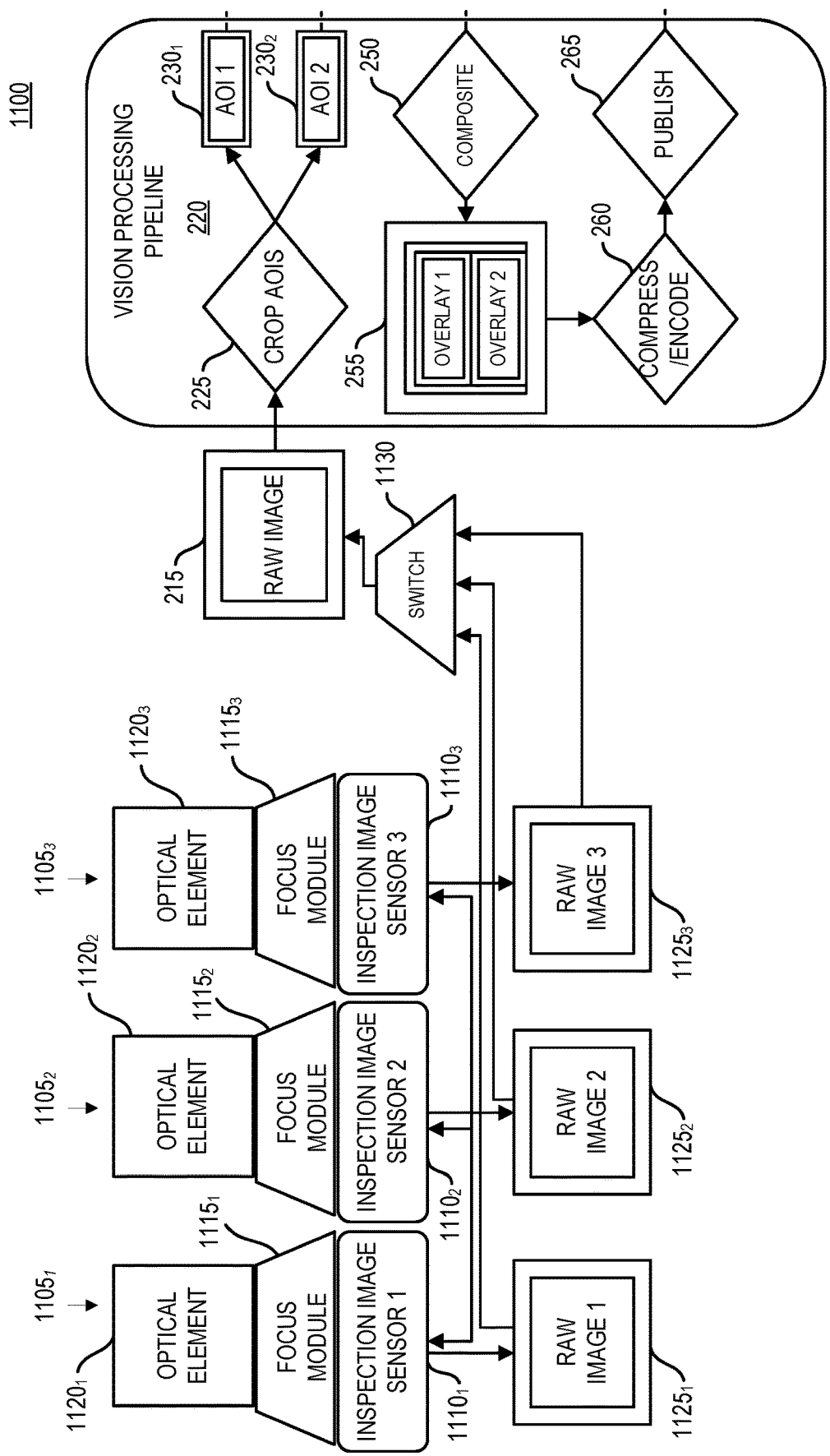
FIG. 11 is a diagram illustrating an architecture with multiple detail camera modules and a software-based switch.

FIG. 11 is a diagram 1110 that illustrates a variation in which there are multiple detail inspection camera modules 1105 . . . that each comprise an image sensor $1110_{1 \ldots n}$, an optical element $1120_{1 \ldots n}$ (e.g., a lens or series of lenses, etc.), and a control module $1115_{1 \ldots n}$ that can, in response to remote commands (either automatic or use-generated), cause a focus attribute of the detail inspection camera module $1105_{1 \ldots n}$ to change via software instructions (this can be accomplished, for example, by changing the mounting distance of the corresponding optical element $1120_{1 \ldots n}$ with respect to the inspection image sensor), as described above. Each of the image sensors $1110_{1 \ldots n}$ can generate a respective raw image $1125_{1 \ldots n}$. These raw images $1125_{1 \ldots n}$ can be selectively provided to the vision processing pipeline 220 described herein (or other processing module or system, etc.) by way of a software-based switch 1130 (e.g., a software multiplexer, etc.). In use, a user can alter focal distances of the optical elements $1120_{1 \ldots n}$, and selectively switch among various available feeds of raw images (for quality assurance purposes and for further processing and/or storage).

In some cases, the inspection camera modules $1005_{1 \ldots n}$ can be co-located such that the respective field of views (FOVs) overlap. In some cases, the FOVs can each overlap at least 25%, in other cases, at least 50%, or in other cases, at least 75%, and in other cases, at least 95%. In some variations, the image sensors 1110 can be uniform. In addition, in some variations, the image sensors 1110 can be contained within a single housing (e.g., a mobile phone or tablet, etc.). The optical elements 1120 can, in some variations, vary to provide different FOVs. The control modules 1115 can be uniform in some variations across the inspection camera modules 1005.

Figure 12:
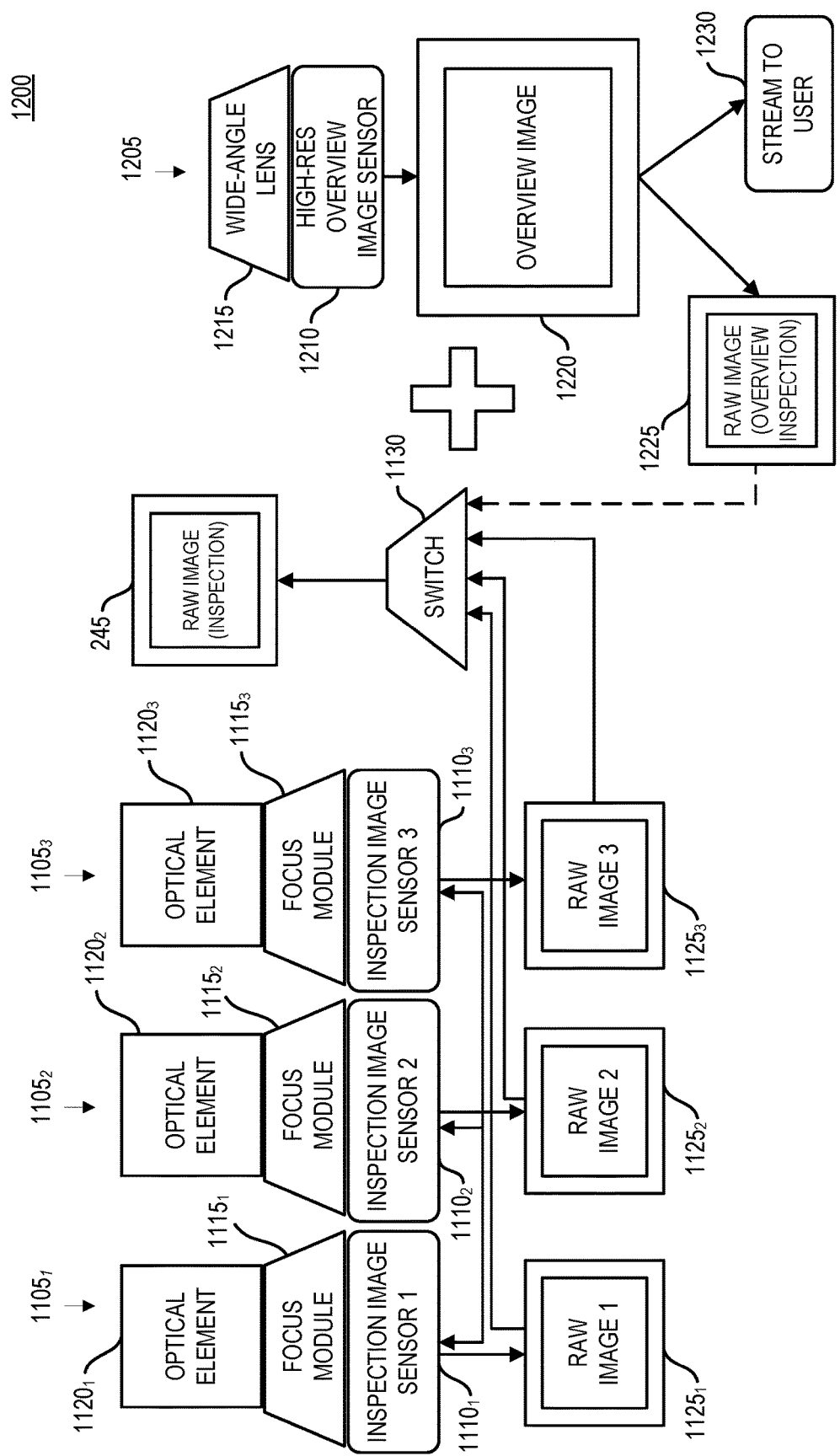
FIG. 12 is a diagram illustrating an architecture with multiple detail camera modules and a software-based switch.

FIG. 12 is a diagram 1200 that illustrates a variation in which there are multiple detail inspection camera modules $1105_{1 \ldots n}$ (such as those illustrated and described in connection with FIG. 11) which are provided in combination with an overview inspection camera module 1205, as described above. The overview inspection camera module 1205 can also include an image sensor 1210 and an optical element 1215 such as a wide angle lens. The overview inspection camera module 1205 can generate an overview image 1220 that provides additional environmental or contextual information useful for quality assurance or other factory monitoring or maintenance purposes. The overview images 1220 can be provided without further processing 1225 and/or the overview images 1220 can be streamed to a user 1230 (or otherwise stored in a data store for subsequent review or analysis). The overview inspection camera module 1205 can optionally include a control module 1220 that can, in response to remote commands (either automatic or use-generated), cause a focus attribute of the overview inspection camera module 1205 to change via software instructions (this can be accomplished by changing a focal distance of the corresponding optical element 1215. The FOV of the overview inspection camera module 1205 can be such that it envelops the FOVs of the inspection camera module $1105_{1 \ldots n}$. This arrangement can be advantageous in that environmental or otherwise contextual information can be obtained by the overview inspection camera module 1205 which can be useful for quality assurance purposes.

The raw image 1225 of the overview inspection camera module can optionally also be provided as another input to the switch 1130 and subsequently be used as the raw image provided to the vision processing pipeline, 215 in FIG. 11 (not shown).

Figure 13:
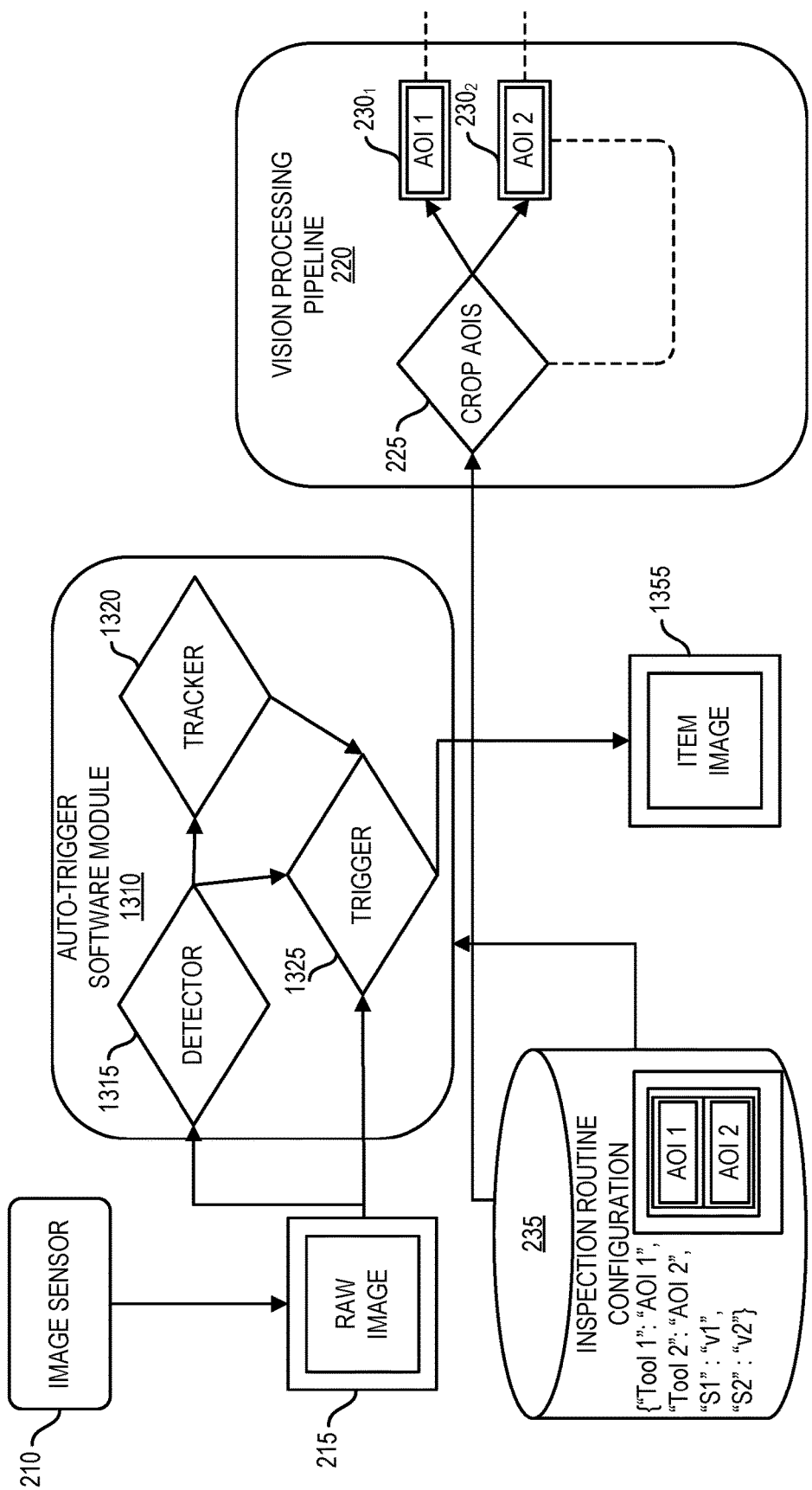
FIG. 13 is a diagram illustrating a fourth image processing workflow.

FIG. 13 is a diagram 1300 illustrating a variation in which there can be software-based triggers as will be described in further detail below. These software-based triggers can be used to obtain an exemplar image for an object (e.g., an image that optimally represents the object) or a set of images (i.e., a set of all unique frames, a set of frames meeting certain predefined object representation parameters, etc.) within a video feed for the object. With regard to the former software-based trigger, the image in which the object is optimally represented reflect aspects such as a most centered representation of the object across all images including the object, a sharpest representation of the object across all images including the object, a representation of the object having image properties closest to a set of reference images on which a quality assurance inspection tool was configured or trained, or other user-defined attributes. With regard to the latter software-based trigger, predefined object representation parameters can reflect aspects such as centeredness, trajectory, minimum object size, maximum object size, sharpness, similarity to preceding images in the feed of images (i.e., duplication/, color space, or other user-defined attributes. In some cases, multiple predefined object representation parameters can be used (e.g., in a logistic regression model or other scoring model) which together are used to identify images for inclusion. Both software-based triggers can use machine learning and/or computer vision algorithms in characterizing each image.

These software-triggers can be used in connection with physical triggers utilizing mechanical switches and/or optical components for object detection purposes. A software-based trigger module 1310 is logically represented in FIG. 13 and can be algorithmically implemented utilizing multiple stages. The first stage can be a detector 1315, which uses multiple algorithms and user-commanded settings as discussed below to determine which areas of the image may contain objects. The second stage can be a tracker 1320, which takes the output of the detector 1315 as an input and determines when the detector 1315 is seeing a new item versus another frame of the same item. For each new item, a unique identifier (e.g., a monotonically increasing number, a pseudorandom number, a globally unique identifier (GUID), etc.) can be assigned to the object by the tracker 1320, which can be utilized to track the object over time throughout the system. The output of the detector 1315 and the tracker 1320 can serve as inputs to the auto-trigger software module 1310, which, depending on user-commanded settings and the state of the detector 1315 and tracker 1325, decides which raw images, 215, will be output as item images, 1355. The item image output from the auto-trigger software module 1310 is then fed as the raw image input to the vision processing pipeline 220.

The detector can use multiple algorithmic methods to serve the purposes described above. To account for the variations of objects that pass in front of the inspection camera module(s), the detector 1315 can cause an image to be binarized in which the white values indicate the pixels where an object was detected (the converse arrangement can also be implemented in which black values indicate where the object was detected). The detector 1315 can also include a salient object detector that is trained to indicate regions of the image that are more salient. In some variations, the salient object detector utilizes one or more foreground segmentation algorithms. The salient object detector can use a convolutional neural network (CNN) that produces a mask that indicates, via a probability on a per pixel basis, where the foreground objects are likely to be. The CNN can be trained on a dataset of thousands of objects with per pixel labels indicating where in the images the salient objects are located. The output of the model can be thresholded by the magnitude of the probability to go from a per-pixel probability mask to a binarized mask that can be fed into the later stages. The detector may also use a visual similarity score for the image, as discussed above, to determine which image of the item most closely matches the user configuration.

If the object that is being imaged has a consistent color and contrasts well with the background, hue saturation value (HSV) filtering can be used by the detector 1315 to set any pixels that fall in the predefined HSV range to white and set the remaining pixels to black. In addition, the detector 1315 can use a dense optical flow algorithm to quantify the motion between subsequent frames in a video sequence. The algorithm can use a CNN that accepts as input two image frames that form a sequence and produces an array indicating the motion between the two frames. The pixels in the output array correspond to a length 2 vector that indicates where the pixel in the first frame ended up moving to in the second frame. During the training procedure, the loss function encourages the neural network to learn a set of weights that minimizes the Euclidean distance between the outputs of the model and the ground truth optical flow. Since it is difficult to hand-label optical flow data, the algorithm is trained on a synthetic dataset of objects moving through space; since the starting and ending position of the synthetic objects are known, there exists ground truth data for where each pixel moved between the frames. In order to end up with a binarized mask, the output of the model is thresholded based on the length of the vector. This arrangement allows the smaller vectors that may have been produced by noise from the camera or optical flow model to be disregarded, and instead only consider significant motion in the scene. In addition to thresholding on vector length, a user supplied direction configuration parameter can be used to filter out any vectors in the model's output that are large in angular distance.

As mentioned above, the tracker 1320 can be used to track unique object instances across different frames. Such triggering is an optional step that depends on the user-commanded trigger mode. For example, the user can specify a "centered" trigger mode in which it is desired to only capture the single most centered frame for each object. The triggering can use the output of the detector and keep track of the centroid of each detected object throughout the frames. The basic logic is as follows: if the centroid in frame i+1 is very close in pixel distance to a centroid in frame i, it can be assumed that the centroids are of the same object instance. In addition to checking pixel distance, the trajectory of the object over time is monitored, rejecting any matches that do not create a smooth trajectory. When the estimated trajectory of an object goes outside of the bounds of the frame and it is no longer detected, and thus, should no longer be tracked.

Alternatively, the user can specify a "continuous" trigger mode, in which all frames in which the object appears can be captured and made available. This mode is useful to be able to only send images to the vision processing pipeline in which an object is present, and not provide images to the vision processing pipeline in which the object is not present. This mode can also optionally filter out images of the product which are similar to the previous image sent to the vision processing pipeline so as to reduce duplicate images if the product is not moving or changing.

In some variations, the inspection routine configuration 235 can include measures aimed at reducing false positives/negatives. For example, the user can command an inspection routine configuration 235 that can specify minimum/maximum object sizes and filter out any detected objects that fall outside these bounds. The user can also use a graphical user interface (GUI) in order to configure the expected direction in which items are expected to flow through the camera's field of view (FOV). The user interface (UI) for configuring this, can include an arrow which the user draws on a reference image to indicate the expected flow direction of objects. The software trigger module 1315, in the triggering stage 1325, can then read these user-commanded settings and filter out any items which the detector and tracker stages are indicating to not be moving within a delta of the user-commanded expected direction of motion. In addition, the inspection routine configuration 235 can be such that any analyses are constrained to a region of the frame (e.g., a region of interest, or ROI). The region of interest can be specified by the user in a user interface. The method by which the user sets the region of interest may be drawing a rectangle or other polygon on a reference image. Such a setting may allow a user to filter out motion or product in areas of the FOV of the camera which are not relevant to their desired product or inspection.

Referring again to FIG. 13, the raw image 215 is passed to both the detector 1315 and the trigger 1325. The detector 1315 can use the raw image 215 to produce the binarized output which indicates where in the image, if at all an object was detected. The trigger 1325 can keep track of the raw image so that it can publish it in the event that the conditions for triggering are met.

Based on the detector mode (salient object detector. HSV, optical flow, etc.), a binarized output is produced by the detector 1315 and sent to both the tracker 1320 and the trigger 1325.

The trigger mode determines if a tracker 1320 is required or not. In the case of the centered mode, the tracker 1320 is not needed to associate the coordinates of the objects found in the mask with objects found in previous frames. This data is sent to the trigger 1325.

Figure 14:
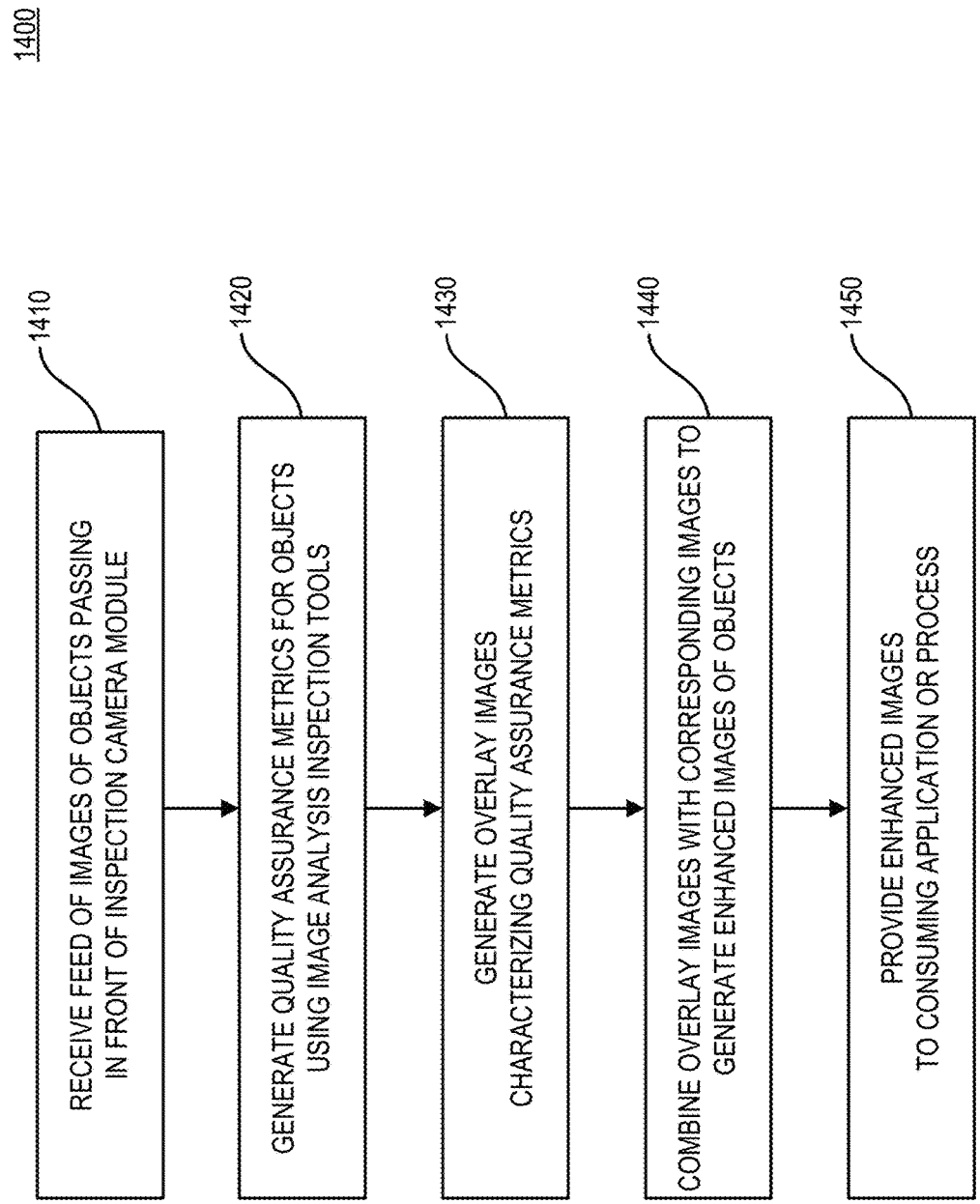
FIG. 14 is a process flow diagram illustrating explainability and complementary information for video-based quality assurance inspection processes.
Figure 15:
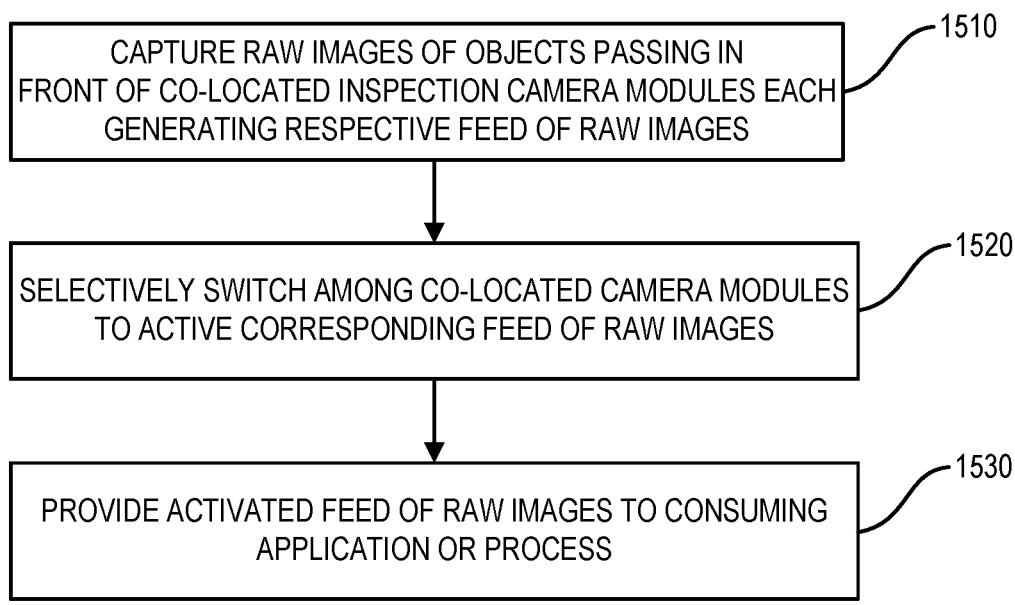
FIG. 15 is a process flow diagram illustrating aspects relating to an intelligent quality assurance and inspection device having multiple camera modules.

FIG. 14 is a process flow diagram 1400 illustrating explainability and complementary information for video-based quality assurance inspection processes in which, at 1410, a video processing pipeline receives data derived from a feed of images of a plurality of objects passing in front of an inspection camera module forming part of a quality assurance inspection system. Quality assurance metrics for the object are generated, at 1420, by one or more containerized image analysis inspection tools forming part of the video processing pipeline using the received data for each object. Overlay images are later generated, at 1430, that characterize the quality assurance metrics. These overlay images are combined, at 1440, with the corresponding image of the object to generate an enhanced image of each of the objects. These enhanced images are provided, at 1450, to a consuming application or process for quality assurance analysis FIG. 15 is a process flow diagram 1500 illustrating an intelligent quality assurance and inspection device having multiple camera modules in which, at 1510, each of a plurality of co-located inspection camera modules captures raw images of objects passing in front of the co-located inspection camera modules which form part of a quality assurance inspection system. The inspection camera modules have either a different image sensor or lens focal properties and generate different feeds of raw images. The co-located inspection camera modules can be selectively switched amongst, at 1520, to activate the corresponding feed of raw images. The activated feed of raw images is provided, at 1530, to a consuming application or process for quality assurance analysis.

Figure 16:
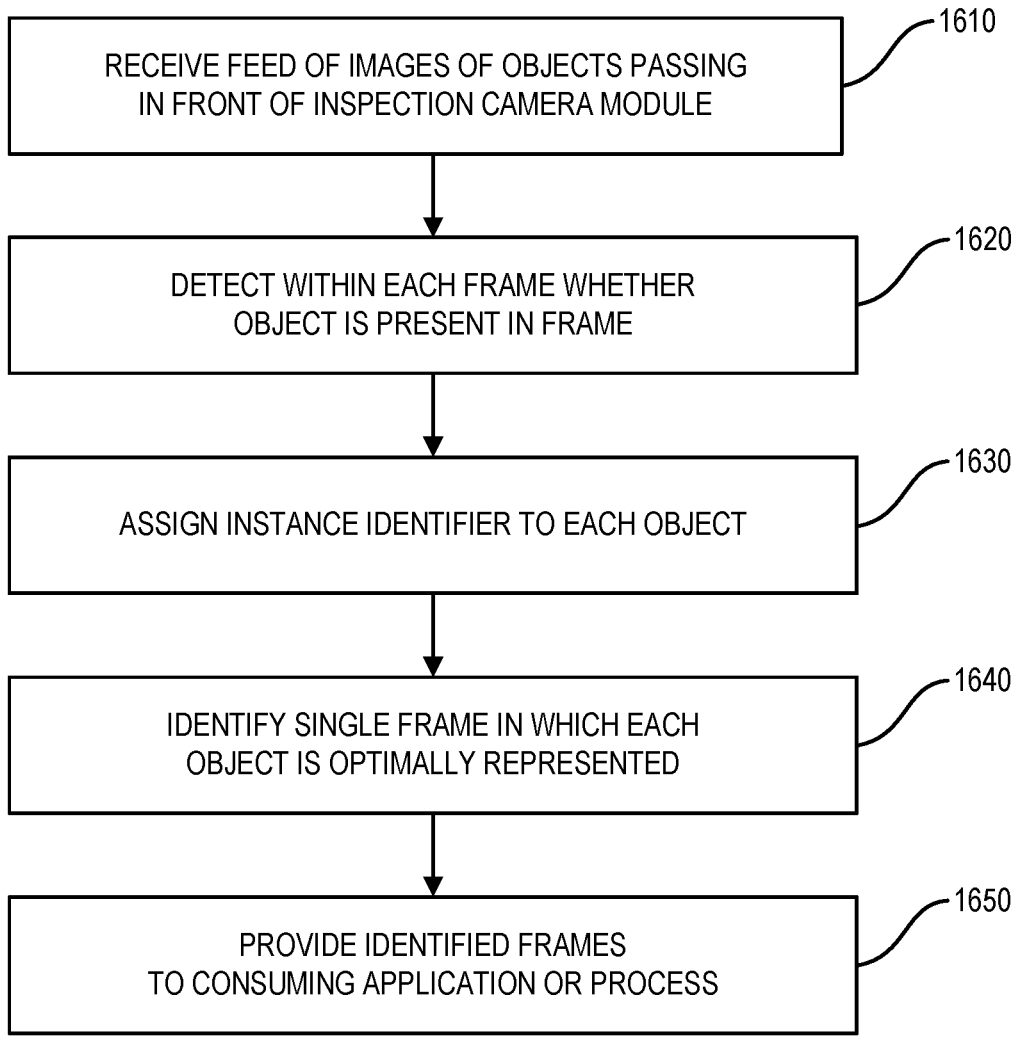
FIG. 16 is a process flow diagram illustrating machine-learning based camera image triggering for quality assurance inspection processes.

FIG. 16 is a process flow diagram 1600 illustrating machine-learning based camera image triggering for quality assurance inspection processes in which, at 1610, data is received that includes a feed of frames of a plurality of objects passing in front of an inspection camera module forming part of a quality assurance inspection system. Within each frame, at 1620, it is detected whether an object is present within the frame. Later, at 1630, instance identifiers are assigned to each object. A single frame is identified, at 1640, in which the object is optimally represented for each object using the corresponding instance identifier. These identified frames are provided, at 1650, to a consuming application or process for quality assurance analysis.

Figure 17:
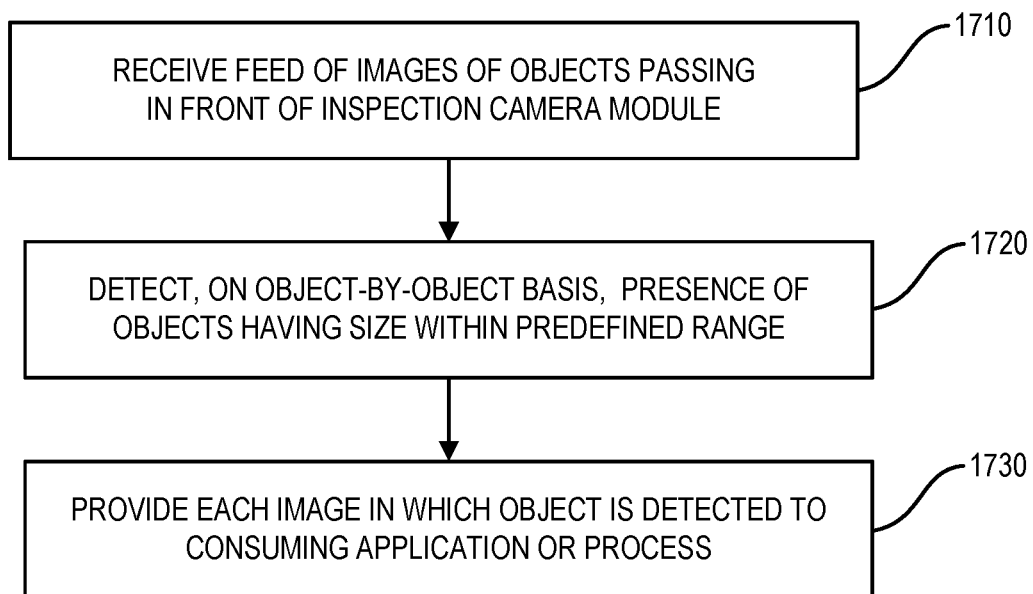
FIG. 17 is a process flow diagram illustrating machine-learning based continuous camera image triggering for quality assurance inspection processes.

FIG. 17 is a process flow diagram illustrating machine-learning based continuous camera image triggering for quality assurance inspection processes in which, at 1710, data is received that includes a feed of images of a plurality of objects passing in front of an inspection camera module forming part of a quality assurance inspection system. Thereafter, at 1720, it is detected whether there is an object within each image. Based on this detection, at 1730, images in which each object is detected that meet predefined object representation parameters are identified (on an object-by-object basis, etc.). The identified images are, at 1740, provided to a consuming application or process for quality assurance analysis.

Figure 18:
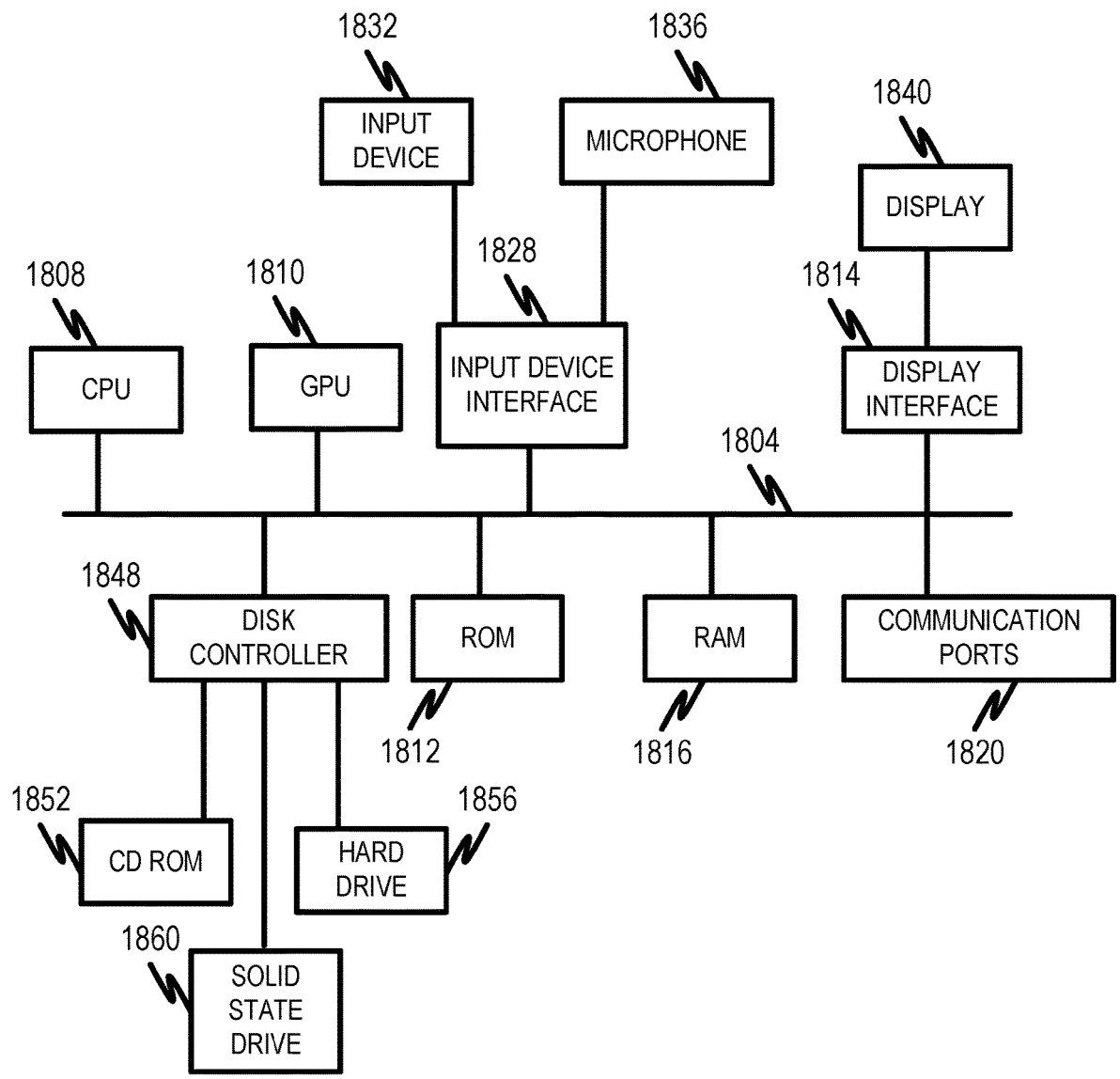
FIG. 18 is a diagram illustrating a computing device for implementing aspects of the current subject matter.

FIG. 18 is a diagram 1800 illustrating a sample computing device architecture for implementing various aspects described herein in which certain components can be omitted depending on the application. A bus 1804 can serve as the information highway interconnecting the other illustrated components of the hardware. A processing system 1808 labeled CPU (central processing unit) (e.g., one or more computer processors/data processors at a given computer or at multiple computers) and/or a GPU-based processing system 1810 can perform calculations and logic operations required to execute a program. A non-transitory processor-readable storage medium, such as read only memory (ROM) 1812 and random access memory (RAM) 1816, can be in communication with the processing system 1808 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1848 can interface with one or more optional disk drives to the system bus 1804. These disk drives can be external or internal floppy disk drives such as 1860, external or internal CD-ROM, CD-R, CD-RW or DVD, or solid state drives such as 1852, or external or internal hard drives 1856. As indicated previously, these various disk drives 1852, 1856, 1860 and disk controllers are optional devices. The system bus 1804 can also include at least one communication port 1820 to allow for communication with external devices either physically connected to the computing system or available externally through a wired or wireless network. In some cases, the at least one communication port 1820 includes or otherwise comprises a network interface.

To provide for interaction with a user, the subject matter described herein can be implemented on a computing device having a display device 1840 (e.g., a CRT (cathode ray tube) or LCD (liquid crystal display) monitor) for displaying information obtained from the bus 1804 via a display interface 1814 to the user and an input device 1832 such as keyboard and/or a pointing device (e.g., a mouse or a trackball) and/or a touchscreen by which the user can provide input to the computer. Other kinds of input devices 1832 can be used to provide for interaction with a user as well; for example, feedback provided to the user can be any form of sensory feedback (e.g., visual feedback, auditory feedback by way of a microphone 1836, or tactile feedback); and input from the user can be received in any form, including acoustic, speech, or tactile input. The input device 1832 and the microphone 1836 can be coupled to and convey information via the bus 1804 by way of an input device interface 1828. Other computing devices, such as dedicated servers, can omit one or more of the display 1840 and display interface 1814, the input device 1832, the microphone 1836, and input device interface 1828.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for providing quality assurance comprising:
   receiving data comprising a feed of images of a plurality of objects passing in front of an inspection camera module forming part of a quality assurance inspection system;
   detecting, within each image, whether an object is present within the image;
   assigning an instance identifier to each object;
   identifying, for each object using the corresponding instance identifier, a single image in which the object is optimally represented;
   discarding images for each object other than the corresponding identified single image; and
   providing the identified images to a consuming application or process for quality assurance analysis.

2. The method of claim 1, wherein the single image in which the object is optimally represented comprises a most centered representation of the object across all images including the object.

3. The method of claim 1, wherein the single image in which the object is optimally represented comprises a sharpest representation of the object across all images including the object.

4. The method of claim 1, wherein the single image in which the object is optimally represented comprises a representation of the object having image properties closest to a set of reference images on which a quality assurance inspection tool was configured or trained.

5. The method of claim 4, wherein the image properties comprise one or more of sharpness, blurriness, color space or visual similarity score.

6. The method of claim 1, wherein the providing comprises: loading the identified images into memory, storing the identified images in physical persistence, causing the identified images to be visually displayed in a graphical user interface, or transmitting the identified images to a remote computing system.

7. The method of claim 1, wherein the detecting comprises:
   generating, using at least one machine learning model, a mask that indicates, via a probability on a per pixel basis, a likely location of an object within each image.

8. The method of claim 7, wherein the at least one machine learning model is a convolutional neural network that is trained using a dataset with per pixel labels indicating locations of salient objects within images.

9. The method of claim 8 further comprising:
   generating, based on the output of the convolutional neural network, a binarized image to indicate pixels within each image at which an object was detected.

10. The method of claim 9, wherein the generating of the binarized image further comprises:
    changing pixels within a defined Hue Saturation Value (HSV) range to a first value; and
    changing pixels outside the predefined HSV range to a second value.

11. The method of claim 1 further comprising:
    determining motion between two adjacent images in the feed.

12. The method of claim 11, wherein the determining of motion uses at least one machine learning model.

13. The method of claim 12, wherein the at least one machine learning model comprises a convolutional neural network that produces a vector corresponding to an array of pixels indicating motion between the two adjacent images.

14. The method of claim 13, wherein the convolutional neural network is causes A trained using a loss function that causes the convolutional neural network to learn a set of weights that minimizes a distance between outputs of the convolutional neural network and a ground truth optical flow.

15. The method of claim 14 further comprising:
    generating, based on the output of the convolutional neural network, a binarized image to indicate pixels within each image at which an object was detected.

16. The method of claim 1, wherein the assigning comprises:
    determining a centroid of an object in each image;
    estimating a trajectory of the centroids of the objects in each image relative to one or more preceding images; and
    stopping tracking of the object when the estimated trajectory goes outside a corresponding image.

17. The method of claim 16, wherein the identifying comprises:
    determining an image in a trajectory of the object in which a centroid of an object is closest to a center of the image.

18. The method of claim 1, wherein the identifying comprises:
    filtering out images having objects below a predetermined size.

19. The method of claim 1, wherein the identifying comprises:
filtering out images having objects above a predetermined size.

20. The method of claim 1, wherein the identifying comprises:
filtering out images having objects advancing outside a predefined trajectory.

21. The method of claim 1, wherein the detecting, assigning, and identifying are constrained within a region of interest of each image.

22. A computer-implemented method for providing quality assurance comprising:
receiving data comprising a feed of images of a plurality of objects passing in front of an inspection camera module forming part of a quality assurance inspection system;
detecting, within each image, whether an object is present within the image;
assigning an instance identifier to each object;
identifying, for each object using the corresponding instance identifier, a single image in which the object is optimally represented;
wherein the detecting, assigning, and identifying are constrained within a single region of interest of each image, the single region of interest being a subset of the corresponding image as a whole; and providing the identified images to a consuming application or process for quality assurance analysis.

23. The method of claim 22, wherein the single image in which the object is optimally represented comprises a most centered representation of the object across all images including the object.

24. The method of claim 22, wherein the single image in which the object is optimally represented comprises a sharpest representation of the object across all images including the object.

25. The method of claim 24, wherein the image properties comprise one or more of sharpness, blurriness, color space or visual similarity score.

26. The method of claim 22, wherein the single image in which the object is optimally represented comprises a representation of the object having image properties closest to a set of reference images on which a quality assurance inspection tool was configured or trained.

27. The method of claim 22 further comprising:
discarding images for each object other than the corresponding identified single image.

28. The method of claim 22, wherein the providing comprises: loading the identified images into memory, storing the identified images in physical persistence, causing the identified images to be visually displayed in a graphical user interface, or transmitting the identified images to a remote computing system.

29. The method of claim 22, wherein the detecting comprises:
generating, using at least one machine learning model, a mask that indicates, via a probability on a per pixel basis, a likely location of an object within each image.

* * * * *